United States Patent
Fukuda et al.

(10) Patent No.: US 9,294,484 B2
(45) Date of Patent: Mar. 22, 2016

(54) SYSTEM, SERVICE PROVIDING DEVICE, AND SERVICE PROVIDING METHOD

(71) Applicants: Yasuharu Fukuda, Kanagawa (JP); Masato Nakajima, Tokyo (JP); Naotoshi Seo, Tokyo (JP); Kenta Yamano, Kanagawa (JP)

(72) Inventors: Yasuharu Fukuda, Kanagawa (JP); Masato Nakajima, Tokyo (JP); Naotoshi Seo, Tokyo (JP); Kenta Yamano, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 96 days.

(21) Appl. No.: 14/065,573

(22) Filed: Oct. 29, 2013

(65) Prior Publication Data
US 2014/0123239 A1    May 1, 2014

(30) Foreign Application Priority Data

Oct. 31, 2012  (JP) .................................. 2012-241367
Oct. 2, 2013   (JP) .................................. 2013-207070

(51) Int. Cl.
    *H04L 29/06*    (2006.01)
(52) U.S. Cl.
    CPC .......... *H04L 63/104* (2013.01); *H04L 63/0807* (2013.01)
(58) Field of Classification Search
    None
    See application file for complete search history.

(56) References Cited

U.S. PATENT DOCUMENTS 6,606,663 B1 *  8/2003  Liao ..................... G06Q 20/20
                                                      705/25
7,421,731 B2 *  9/2008  Mitchell ............. H04L 63/0815
                                                      726/2
(Continued)

FOREIGN PATENT DOCUMENTS

JP    2003-296277    10/2003
JP    2005-011098     1/2005
(Continued)

OTHER PUBLICATIONS

CableLabs: Authentication and Authorization through Client Applications, CL-SP-AUTH-APP-I01-120118, CableLabs® Specifications OnLine Content Access, Jan. 18, 2012.*

(Continued)

*Primary Examiner* — Peter Poltorak
(74) *Attorney, Agent, or Firm* — IPUSA, PLLC

(57) ABSTRACT

A service providing device includes a requesting unit for receiving, from the device operated by a user, a request for a process of using a service providing system having a different authentication base, and making a request to acquire authorization information for using the service providing system; a substitute authentication unit for acquiring authentication information of the service providing system from a second storage when the authorization information associated with the user is not stored in a first storage, and acquiring the authorization information from the service providing system by using the authentication information; and a providing unit for providing the authorization information stored in the first storage when the authorization information associated with the user is stored in the first storage, and providing the authorization information acquired from the service providing system when the authorization information associated with the user is not stored in the first storage.

11 Claims, 20 Drawing Sheets

(56) References Cited

U.S. PATENT DOCUMENTS

| | | | | |
|---|---|---|---|---|
| 7,698,734 B2* | 4/2010 | Kupherstein | H04L 63/0815 | 726/10 |
| 7,904,949 B2* | 3/2011 | Bowers | H04L 63/0807 | 380/255 |
| 8,006,289 B2 | 8/2011 | Hinton et al. | | |
| 8,453,209 B2* | 5/2013 | Cen | H04L 63/08 | 709/227 |
| 8,509,431 B2* | 8/2013 | Schmidt | H04L 63/061 | 380/44 |
| 8,526,445 B2* | 9/2013 | Kim | H04L 63/10 | 370/395.2 |
| 8,850,187 B2* | 9/2014 | Hoggan | H04L 9/3268 | 713/156 |
| 2001/0008997 A1* | 7/2001 | Masuda | G06Q 10/06 | 705/7.17 |
| 2002/0007317 A1* | 1/2002 | Callaghan | G06Q 30/02 | 705/26.8 |
| 2002/0150253 A1* | 10/2002 | Brezak | H04L 63/0428 | 380/281 |
| 2003/0191810 A1* | 10/2003 | Muhlestein | H04L 63/10 | 709/215 |
| 2003/0212892 A1* | 11/2003 | Oishi | H04L 29/12009 | 713/168 |
| 2004/0088543 A1* | 5/2004 | Garg | H04L 63/0815 | 713/157 |
| 2004/0139319 A1* | 7/2004 | Favazza | H04L 63/0807 | 713/168 |
| 2004/0228356 A1* | 11/2004 | Adamczyk | H04L 12/2887 | 370/401 |
| 2005/0039054 A1* | 2/2005 | Satoh | H04L 63/0815 | 726/4 |
| 2006/0021019 A1* | 1/2006 | Hinton | G06F 21/41 | 726/10 |
| 2006/0053296 A1* | 3/2006 | Busboom | H04L 63/083 | 713/182 |
| 2006/0230265 A1* | 10/2006 | Krishna | H04L 63/08 | 713/158 |
| 2007/0118734 A1 | 5/2007 | Oseto et al. | | |
| 2007/0245414 A1* | 10/2007 | Chan | H04L 63/0823 | 726/12 |
| 2007/0289002 A1* | 12/2007 | van der Horst | G06F 21/42 | 726/9 |
| 2008/0059804 A1* | 3/2008 | Shah | G06F 21/41 | 713/186 |
| 2008/0072301 A1* | 3/2008 | Chia | H04L 63/0815 | 726/8 |
| 2011/0099616 A1* | 4/2011 | Mazur | H04L 63/0846 | 726/7 |
| 2011/0126017 A1* | 5/2011 | Blom | H04L 63/06 | 713/171 |
| 2011/0202986 A1* | 8/2011 | Horn | H04L 63/0815 | 726/7 |
| 2013/0104219 A1* | 4/2013 | Kumar | H04L 9/321 | 726/9 |
| 2013/0198211 A1 | 8/2013 | Kohkaki et al. | | |
| 2013/0205133 A1* | 8/2013 | Hess | H04L 63/0884 | 713/155 |

FOREIGN PATENT DOCUMENTS

| | | |
|---|---|---|
| JP | 2005-062556 | 3/2005 |
| JP | 2007-172588 | 7/2007 |
| JP | 2009-519529 | 5/2009 |
| JP | 2013-178748 | 9/2013 |

OTHER PUBLICATIONS

Oracle: Understanding Security for Oracle WebLogic Server, 11g Release 1 (10.3.6), E13710-06, Oracle® Fusion Middleware, Nov. 2011.*

* cited by examiner

FIG.7

| id | ORGANIZATION ID | ORGANIZATION NAME | .... | .... | .... |
|---|---|---|---|---|---|
| 1 | XXX | COMPANY A | | | |
| 2 | YYY | COMPANY B | | | |
| ⋮ | | | | | |

FIG.8

| id | ORGANIZATION ID | USER ID | PASSWORD | USER NAME | .... |
|---|---|---|---|---|---|
| 1 | XXX | UserA | AAA | USER A | |
| 2 | XXX | UserB | BBB | USER B | |
| ⋮ | | | | | |
| | YYY | UserC | CCC | USER C | |
| | YYY | UserD | DDD | USER D | |

FIG.9

| id | ORGANIZATION ID | DEVICE AUTHENTICATION INFORMATION | BUSINESS OFFICE INFORMATION | CAPABILITY | ... |
|---|---|---|---|---|---|
| 1 | XXX | 111 | BUSINESS OFFICE A | A4 COLOR MACHINE | |
| 2 | XXX | 222 | BUSINESS OFFICE B | A2 COLOR MACHINE | |
| 3 | XXX | 333 | BUSINESS OFFICE B | A4 MONOCHROME MACHINE | |
| 4 | YYY | 444 | — | A4 COLOR MACHINE | |

FIG.10

| id | ORGANIZATION ID | USER ID | EXTERNAL SERVICE NAME | EXTERNAL SERVICE USER NAME | EXTERNAL SERVICE PASSWORD | ADDITIONAL INFORMATION |
|---|---|---|---|---|---|---|
| 1 | XXX | UserA | EXTERNAL SERVICE A | User A | XXX | |
| 2 | XXX | UserA | EXTERNAL SERVICE C | AAAAA | XXX | |
| 3 | XXX | UserA | EXTERNAL SERVICE B | User A | XXX | |
| 4 | XXX | UserB | EXTERNAL SERVICE A | User B | XXX | |
| 5 | XXX | UserB | EXTERNAL SERVICE B | BBBBB | XXX | |
| ... | | | | | | |
| | YYY | UserC | EXTERNAL SERVICE B | AAAQA | XXX | |
| | | | | | | |

FIG.11

| id | ORGANIZATION ID | USER ID | EXTERNAL SERVICE NAME | AUTHENTICATION TOKEN | EXPIRATION DATE |
|---|---|---|---|---|---|
| 1 | XXX | UserA | EXTERNAL SERVICE A | token:aaaaa, refdlesh:bbbbbb | 2012/8/15 |
| 2 | XXX | UserA | EXTERNAL SERVICE C | token:ccccc, refdlesh:ddddd | 2012/8/15 |
| 3 | XXX | UserA | EXTERNAL SERVICE B | token:eeeee, refdlesh:fffff | 2012/8/17 |
| ... | | | | | |
| | YYY | UserC | EXTERNAL SERVICE B | token:aaaaa, refdlesh:bbbbbb | 2012/8/15 |

FIG.14

```
▲▲▲
FILE(F) EDIT(E) DISPLAY(V) HISTORY(S) BOOKMARK(B) TOOL(T) HELP(H)    _ □ ×
← → ⟲ ⌂ ⊙ ▣ | www.xxxx.co.jp              ☆ ▼ | ✕      ?
                                           ♦ XXXXXXX  ⇠⬚ LOG OUT
⌗  | Applications | Service Management | User Management | Log Management | Settings |

USER INFORMATION
INPUT USER INFORMATION. (MESSAGE FIRST LINE)
(MESSAGE SECOND LINE)

USER ID:          [ 123                    ]
PASSWORD:         [ 123 ] [CHANGE]
MAIL ADDRESS 1:   [ 123                    ]
MAIL ADDRESS 2:   [ 123                    ]
MAIL ADDRESS 3:   [ 123                    ]
LAST NAME:        [ 123                    ]
FIRST NAME:       [ 123                    ]
ORGANIZATION 1:   [ 123                    ]
ORGANIZATION 2:   [ 123                    ]
ORGANIZATION 3:   [ 123                    ]
ORGANIZATION 4:   [ 123                    ]
ORGANIZATION 5:   [ 123                    ]
ROLE:             [ 123                  ▽ ]
LANGUAGE:         [ 123                  ▽ ]
TIME ZONE:        [ 123                  ▽ ]
EXTERNAL SERVICE A : [SETTING] [RELEASE]  HAS BEEN SET
EXTERNAL SERVICE B : [SETTING] [RELEASE]  NOT SET
                       `----1011----'
[ OK ]  [ CANCEL ]
```

| id | ORGANIZATION ID | USER ID | EXTERNAL SERVICE ID | EXTERNAL SERVICE NAME | EXTERNAL SERVICE USER NAME | EXTERNAL SERVICE PASSWORD | ADDITIONAL INFORMATION |
|---|---|---|---|---|---|---|---|
| 1 | XXX | UserA | OOOOO | EXTERNAL SERVICE A | User A | XXX | |
| 2 | XXX | UserA | PPPPP | EXTERNAL SERVICE C | AAAAA | XXX | |
| 3 | XXX | UserA | QQQQQ | EXTERNAL SERVICE B | User A | XXX | |
| 4 | XXX | UserB | RRRRRR | EXTERNAL SERVICE A | User B | XXX | |
| 5 | XXX | UserB | SSSSSS | EXTERNAL SERVICE B | BBBBB | XXX | |
| ... | | | | | | | |
| | YYY | UserC | TTTTTT | EXTERNAL SERVICE B | AAAQA | XXX | |
| | | | | | | | |
| | | | | | | | |

SYSTEM, SERVICE PROVIDING DEVICE, AND SERVICE PROVIDING METHOD

BACKGROUND OF THE INVENTION

1. Field of the Invention

The present invention relates to a system, a service providing device, and a service providing method.

2. Description of the Related Art

Conventionally, there is known a network device for providing a network system by which communications can be performed more safely, when providing a single sign-on function to a plurality of services on WWW (see, for example, Patent Document 1).

A conventional network device for providing services according to requests from a client includes a processing unit and a communication control unit. The processing unit provides a service that has been requested. The communication control unit makes an inquiry to an authentication server when access is received from a client who has not logged in, issues an authentication ticket for accessing the network device if the authentication has been completed, and receives the authentication ticket when an access is received from a client that has logged in and causes the processing unit to perform the service.

In recent years, a usage format that provides services, typified by a cloud service, and a server side application function, has been attracting attention. In such a usage format, there are cases where authentication is required for receiving a service. However, when a plurality of services perform authentication according to different authentication bases (authentication standards), the user needs to perform the authentication by the authentication bases of the respective services which the user wants to use, and therefore user operability has been poor.

Patent Document 1: Japanese Laid-Open Patent Publication No. 2003-296277

SUMMARY OF THE INVENTION

The present invention provides a system, a service providing device, and a service providing method, in which one or more of the above-described disadvantages are eliminated.

According to an aspect of the present invention, there is provided a system including a first service providing system configured to provide a service to a device; a second service providing system that has an authentication base that is different from that of the first service providing system; an authorization information acquisition requesting unit configured to receive, from the device operated by a user, a request for a process of using the second service providing system, and make a request to acquire authorization information after authentication for using the second service providing system; a substitute authentication unit configured to acquire authentication information of the second service providing system from a second storage unit configured to store the authentication information of the second service providing system when the authorization information after authentication associated with the user is not stored in a first storage unit configured to store the authorization information after authentication, and acquire the authorization information after authentication from the second service providing system by using the authentication information that has been acquired; and an authorization information providing unit configured to provide the authorization information after authentication stored in the first storage unit when the authorization information after authentication associated with the user is stored in the first storage unit, and provide the authorization information after authentication acquired from the second service providing system when the authorization information after authentication associated with the user is not stored in the first storage unit.

According to an aspect of the present invention, there is provided a service providing device for providing a service to a device, the service providing device including an authorization information acquisition requesting unit configured to receive, from the device operated by a user, a request for a process of using a service providing system having a different authentication base, and make a request to acquire authorization information after authentication for using the service providing system; a substitute authentication unit configured to acquire authentication information of the service providing system from a second storage unit configured to store the authentication information of the service providing system when the authorization information after authentication associated with the user is not stored in a first storage unit configured to store the authorization information after authentication, and acquire the authorization information after authentication from the service providing system by using the authentication information that has been acquired; and an authorization information providing unit configured to provide the authorization information after authentication stored in the first storage unit when the authorization information after authentication associated with the user is stored in the first storage unit, and provide the authorization information after authentication acquired from the service providing system when the authorization information after authentication associated with the user is not stored in the first storage unit.

According to an aspect of the present invention, there is provided a service providing method performed in a system including a first service providing system configured to provide a service to a device, and a second service providing system that has an authentication base that is different from that of the first service providing system, the service providing method including receiving, from the device operated by a user, a request for a process of using the second service providing system, and making a request to acquire authorization information after authentication for using the second service providing system; acquiring authentication information of the second service providing system from a second storage unit configured to store the authentication information of the second service providing system when the authorization information after authentication associated with the user is not stored in a first storage unit configured to store the authorization information after authentication, and acquiring the authorization information after authentication from the second service providing system by using the authentication information that has been acquired; and providing the authorization information after authentication stored in the first storage unit when the authorization information after authentication associated with the user is stored in the first storage unit, and providing the authorization information after authentication acquired from the second service providing system when the authorization information after authentication associated with the user is not stored in the first storage unit.

BRIEF DESCRIPTION OF THE DRAWINGS

Other objects, features and advantages of the present invention will become more apparent from the following detailed description when read in conjunction with the accompanying drawings, in which:

FIG. 7 is a configuration diagram of an example of organization management information;

FIG. 8 is a configuration diagram of an example of user management information;

FIG. 9 is a configuration diagram of an example of device management information;

FIG. 10 is a configuration diagram of an example of substitute authentication information;

FIG. 11 is a configuration diagram of an example of substitute authentication token information;

FIG. 14 is an image diagram of an example of a user management information registration screen;

FIG. 22 is a configuration diagram of another example of the substitute authentication information.

DETAILED DESCRIPTION OF THE PREFERRED EMBODIMENTS

A description is given, with reference to the accompanying drawings, of embodiments of the present invention.

First Embodiment

System Configuration

Figure 1:
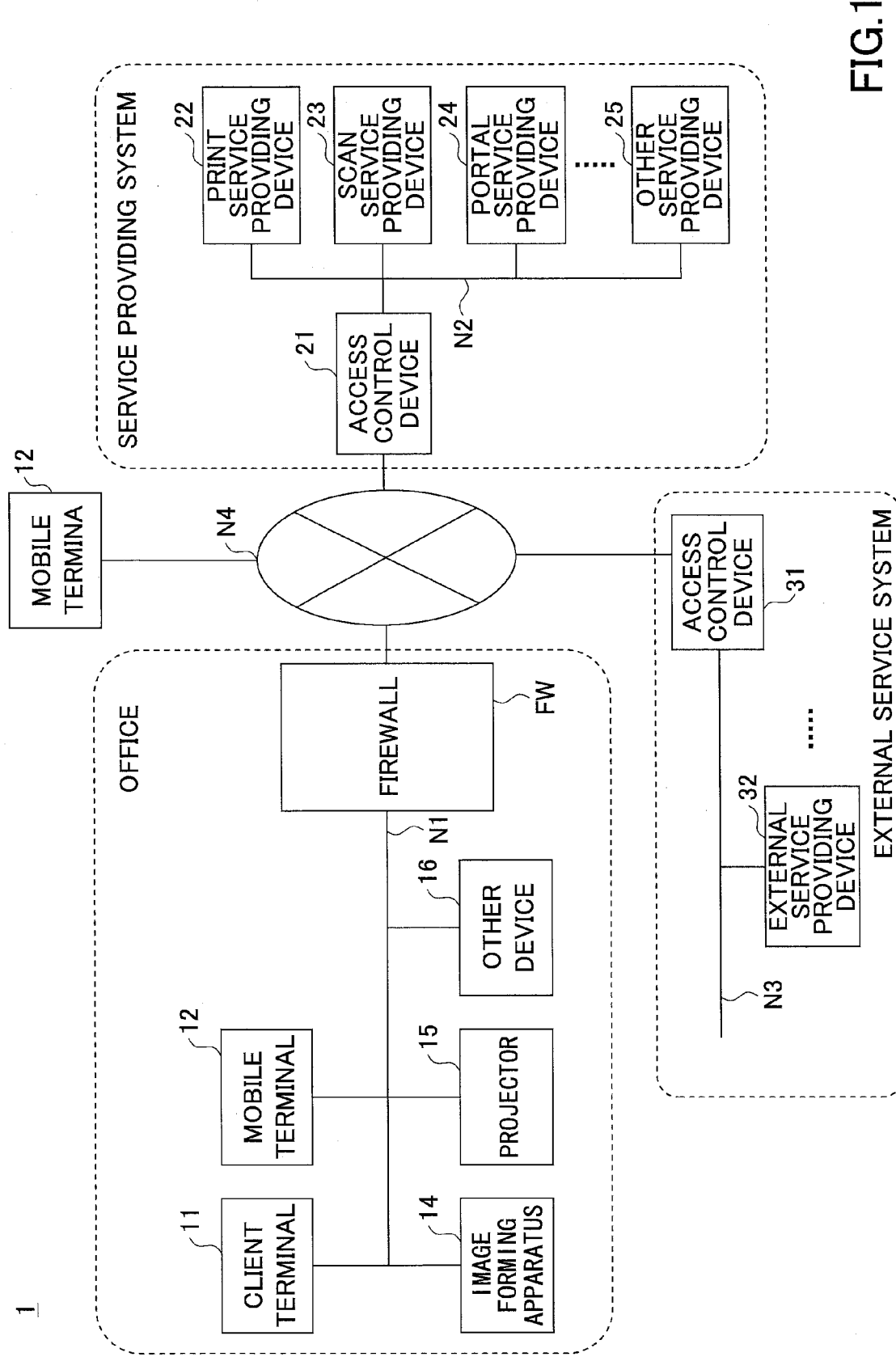
FIG. 1 illustrates a configuration example of a system according to an embodiment.

FIG. 1 illustrates a configuration example of a system according to a first embodiment. A system 1 in FIG. 1 includes a network N1 which is, for example, a network in an office, a network N2 of a service providing system that is typically a cloud service, a network N3 that is an external service that is typically a cloud service, and a network N4 such as the Internet.

The network N1 is a private network inside a firewall FW. The firewall FW is provided at the contact point between the network N1 and the network N4, and detects and blocks unauthorized access. A client terminal 11, a mobile terminal 12, an image forming apparatus 14 such as a multifunction peripheral, a projector 15, and an other device 16 such as an electronic blackboard, are connected to the network N1.

The client terminal 11 is an example of a terminal device. The client terminal 11 is realized by an information processing device (computer system) in which a typical OS, etc., is installed. The client terminal 11 includes a wireless communication unit or a wired communication unit. The client terminal 11 is a terminal that can be operated by the user, such as a tablet PC and a notebook PC.

The mobile terminal 12 is an example of a terminal device. The mobile terminal 12 includes a wireless communication unit or a wired communication unit. The mobile terminal 12 is a terminal that can be carried by the user, such as a smartphone, a mobile phone, a tablet PC, and a notebook PC.

The image forming apparatus 14 is a device having an image forming function such as a multifunction peripheral. The image forming apparatus 14 includes a wireless communication unit or a wired communication unit. The image forming apparatus 14 is a device for performing processes relevant to image formation, such as a multifunction peripheral, a copier, a scanner, a printer, and a laser printer. The projector 15 is a device for projecting images. The projector 15 includes a wireless communication unit or a wired communication unit.

In FIG. 1, as one example, there is one of each of the client terminal 11, the mobile terminal 12, the image forming apparatus 14, the projector 15, and the other device 16; however, there may be a plurality of each of these devices.

The network N2 is connected to the network N4 such as the Internet by an access control device 21. The security of the network N2 is protected by the access control device 21. To the network N2, a print service providing device 22, a scan service providing device 23, a portal service providing device 24, and an other service providing device 25, are connected. In the system 1 of FIG. 1, the access control device 21, the print service providing device 22, the scan service providing device 23, the portal service providing device 24, and the other service providing device 25 realize a service providing system.

The access control device 21 controls log in to services, such as a print service provided by the print service providing device 22, a scan service provided by the scan service providing device 23, and a portal service provided by the portal service providing device 24.

The access control device 21, the print service providing device 22, the scan service providing device 23, the portal service providing device 24, and the other service providing device 25 are realized by one or more information processing devices (computer systems).

Note that the print service providing device 22, the scan service providing device 23, the portal service providing device 24, and the other service providing device 25 in the system 1 of FIG. 1 may be implemented by being combined in a single computer, or may be realized by being distributed among a plurality of computers.

The network N3 is connected to the network N4 such as the Internet by an access control device 31. The security of the network N3 is protected by the access control device 31. To the network N3, one or more external service providing devices 32 are connected. In the system 1 of FIG. 1, the access control device 31 and the external service providing device 32 constitute an external service system.

The access control device 31 controls the log in to an external service provided by the external service providing device 32. The access control device 31 and the external service providing device 32 are realized by one or more information processing devices (computer systems). Note that the external service providing device 32 of the system 1 of FIG. 1 may be realized by being combined in a single computer, or may be realized by being distributed among a plurality of computers.

Some of the services of the network N2 may be outside the network N2. The mobile terminal 12 may be outside the network N1 such as a network in an office. In the example of the system 1 of FIG. 1, the mobile terminal 12 is in the network N1 and in the network N4 such as the Internet. Furthermore, in the system 1 of FIG. 1, there is one external service system; however, there may be a plurality of external service systems.

In the system 1 of FIG. 1, authentication is performed in the service providing system and the external service system by different authentication bases. In the system 1 of FIG. 1, the authentication base of the service providing system performs a process of cooperating with the authentication base of the external service system, so that even when using an external service system of a different authentication base, single sign-on by the user can be realized.

Furthermore, in the system 1 of FIG. 1, the authentication base of the service providing system manages account information required for performing authentication with an authentication base of the external service system, performs an authentication process for acquiring an authentication token from the external service system, and saving the acquired authentication token, so that the authentication tokens can be managed in a collective manner. Therefore, in the system 1 of FIG. 1, the authentication base of the service providing system collectively manages the authentication tokens, so that security is improved.

Hardware Configuration

Figure 2:
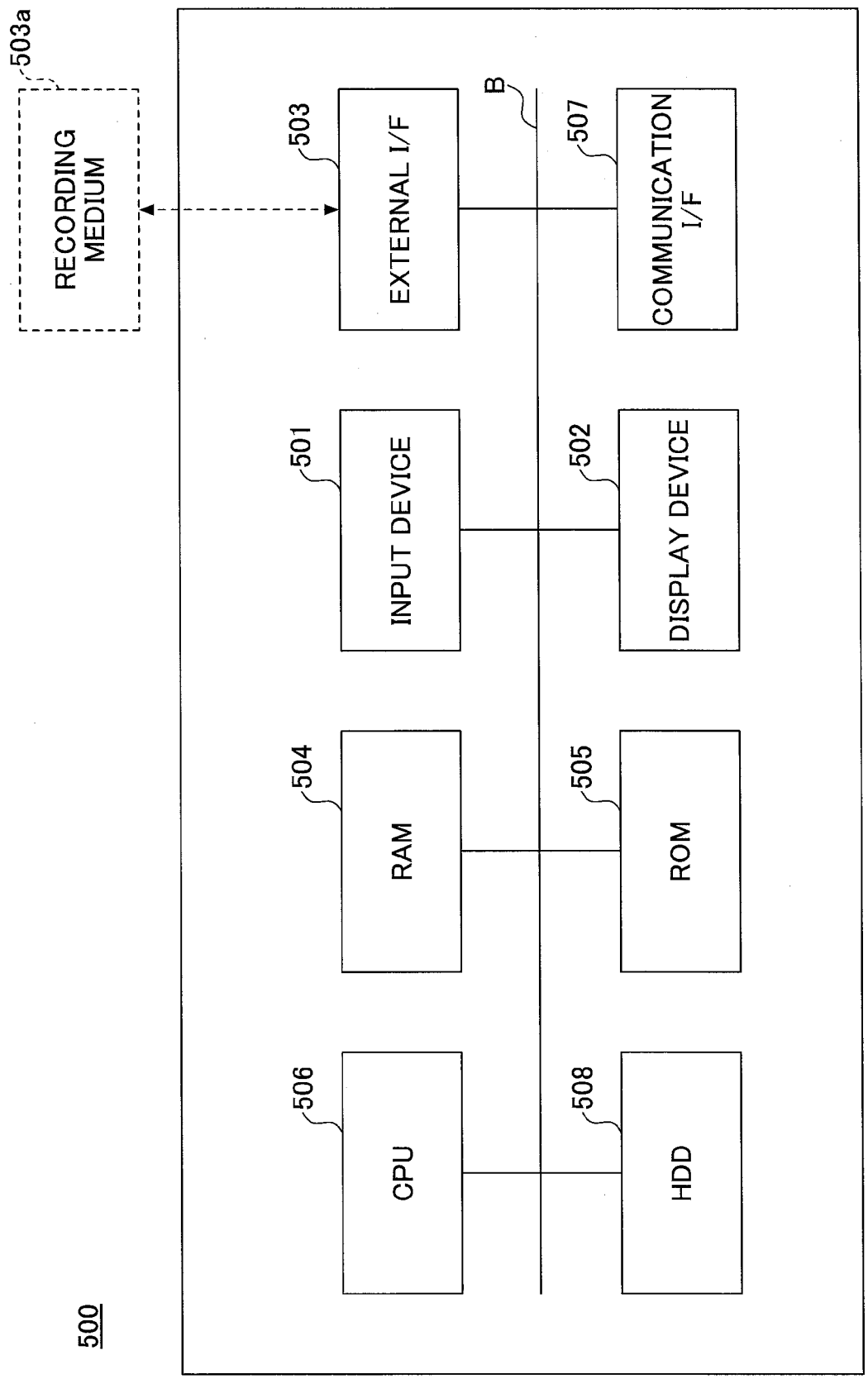
FIG. 2 is a hardware configuration diagram of an example of a computer system according to an embodiment.

The client terminal 11, the mobile terminal 12, the access control device 21, the print service providing device 22, the scan service providing device 23, the portal service providing device 24, and the other service providing device 25 are realized by, for example, a computer system having the hardware configuration of FIG. 2. Furthermore, the access control device 31 and the external service providing device 32 are also realized by, for example, a computer system having the hardware configuration of FIG. 2.

FIG. 2 is a hardware configuration diagram of an example of a computer system according to the present embodiment. A computer system 500 illustrated in FIG. 2 includes an input device 501, a display device 502, an external I/F 503, a RAM (Random Access Memory) 504, a ROM (Read-Only Memory) 505, a CPU (Central Processing Unit) 506, a communication I/F 507, and a HDD (Hard Disk Drive) 508, which are interconnected by a bus B.

The input device 501 includes a keyboard, a mouse, and a touch panel, and is used by the user for inputting various operation signals. The display device 502 includes a display, etc., and displays results of processes performed by the computer system 500.

The communication I/F 507 is an interface for connecting the computer system 500 to the networks N1 through N4. Accordingly, the computer system 500 can perform data communication via the communication I/F 507.

The HDD 508 is a nonvolatile storage device storing programs and data. The programs and data that are stored include, for example, an OS (Operating System) that is the basic software for controlling the entire computer system 500, and application software for providing various functions in the OS. The HDD 508 manages the stored programs and data by a predetermined file system and/or a DB (database).

The external I/F 503 is an interface between the computer system 500 and an external device. An example of an external device is a recording medium 503a. Accordingly, the computer system 500 can read or write data in the recording medium 503a via the external I/F 503. Examples of the recording medium 503a are a flexible disk, a CD (Compact Disk), a DVD (Digital Versatile Disk), a SD memory card, and a USB memory (Universal Serial Bus memory).

The ROM 505 is a nonvolatile semiconductor memory (storage device) that can hold programs and data even after the power is turned off. The ROM 505 stores programs and data such as BIOS (Basic Input/Output System), which is executed when the computer system 500 is started up, OS settings, and network settings. The RAM 504 is a volatile semiconductor memory (storage device) for temporarily holding programs and data.

The CPU 506 is a processor that controls the entire computer system 500 and realizes functions, by loading the programs and data from storage devices such as the ROM 505 and the HDD 508 into the RAM 504, and executing processes.

The client terminal 11, the mobile terminal 12, the access control device 21, the print service providing device 22, the scan service providing device 23, the portal service providing device 24, and the other service providing device 25 realize various processes as described below, by the hardware configuration of the computer system 500. Furthermore, the access control device 31 and the external service providing device 32 also realize various processes as described below, by the hardware configuration of the computer system 500.

Software Configuration
Service Providing System

Figure 3:
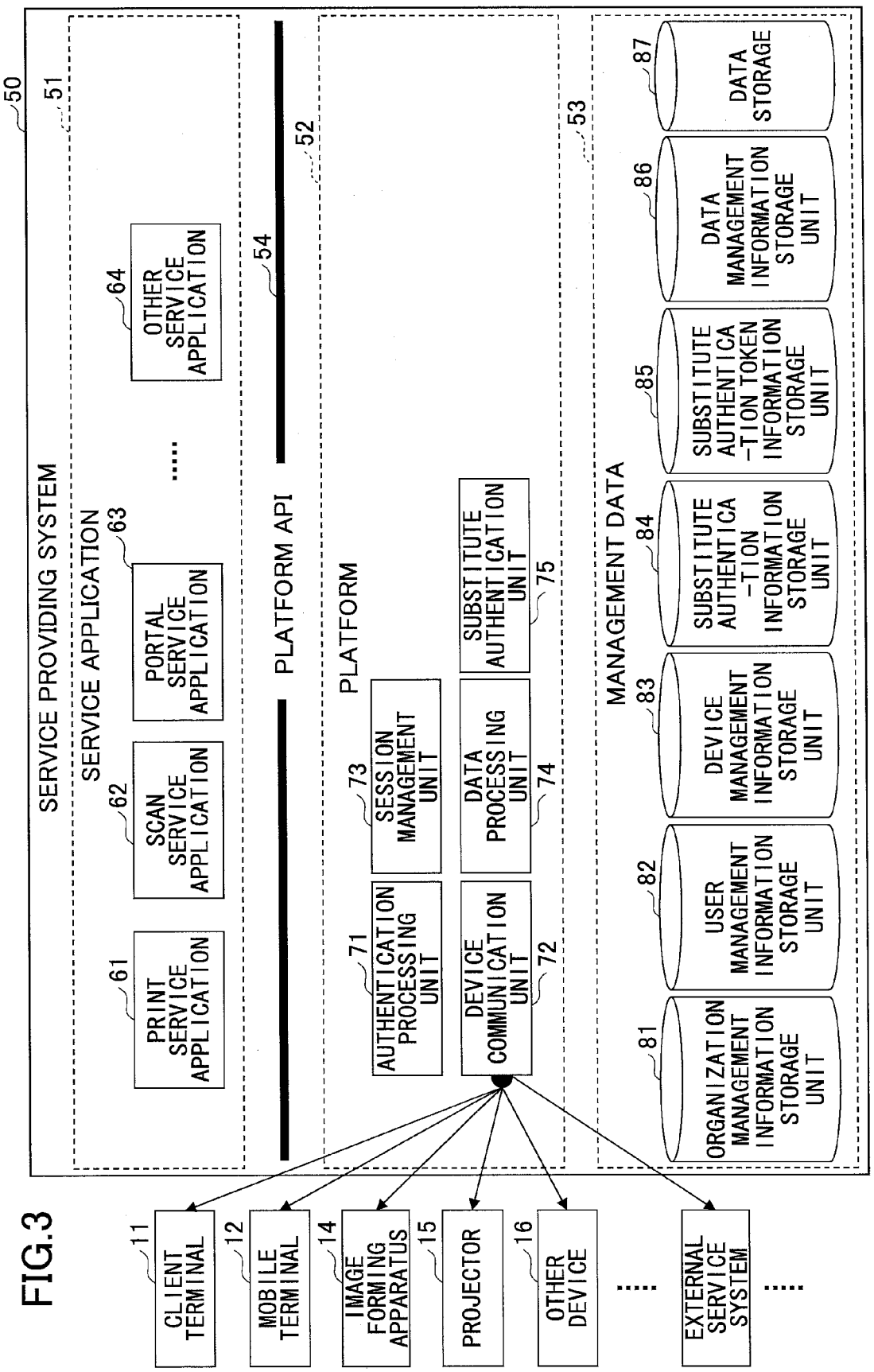
FIG. 3 is a process block diagram of an example of a service providing system according to an embodiment.

The service providing system according to the present embodiment is realized by, for example, the process blocks as illustrated in FIG. 3. FIG. 3 is a process block diagram of an example of a service providing system according to the present embodiment. A service providing system 50 in FIG. 3 executes programs to realize a service application 51, a platform 52, a management data storage unit 53, and a platform API (Application Programming Interface) 54.

The service application 51 of FIG. 3 includes, for example, a print service application 61, a scan service application 62, a portal service application 63, and one or more other service applications 64. The print service application 61 is an application for providing print services. The scan service application 62 is an application for providing scan services. The portal service application 63 is an application for providing portal services. Furthermore, the other service application 64 is an application for providing some service.

The platform API 54 is an interface for using the platform 52, used by the service application 51 such as the print service application 61, the scan service application 62, the portal service application 63, and the other service application 64. The platform API 54 is an interface defined in advance which is provided for the platform 52 to receive requests from the service application 51, and is constituted by, for example, functions, classes, etc. Note that when the service providing system 50 is distributed among a plurality of information processing devices, for example, a Web API that can be used via the network may be used as the platform API 54.

The platform 52 of FIG. 3 includes, for example, an authentication processing unit 71, a device communication unit 72, a session management unit 73, a data processing unit 74, and a substitute authentication unit 75. The authentication processing unit 71 executes authentication based on a log in request from an office device such as the client terminal 11 and the image forming apparatus 14. An office device is a collective term of the client terminal 11, the mobile terminal 12, the image forming apparatus 14, the projector 15, and the other device 16. The device communication unit 72 executes communication with office devices and an external service system.

The session management unit 73 manages sessions with office devices and an external service system. The data processing unit 74 executes data processing based on a request from the service application 51. The substitute authentication unit 75 performs substitute authentication on an external service system.

The management data storage unit 53 includes, for example, an organization management information storage unit 81, a user management information storage unit 82, a device management information storage unit 83, a substitute authentication information storage unit 84, a substitute authentication token information storage unit 85, a data management information storage unit 86, and a data storage 87.

The organization management information storage unit 81 stores the organization management information described below. The user management information storage unit 82 stores the user management information described below. The device management information storage unit 83 stores the device management information described below. The substitute authentication information storage unit 84 stores the substitute authentication information described below. The substitute authentication token information storage unit 85 stores the substitute authentication token information described below. The data management information storage unit 86 stores data management information. The data storage 87 stores other data.

The platform 52 includes functions common to a plurality of the service applications 51 and the basic functions used from a plurality of the service applications 51, etc. In the present embodiment, the authentication processing unit 71, the device communication unit 72, the session management unit 73, the data processing unit 74, the substitute authentication unit 75, etc., belong to the platform 52. Functions of the units in the platform 52 are open to the public in the service application 51 via the platform API 54.

In other words, the service application 51 can use the functions of these units in a range open to the public by the platform API 54. Note that as illustrated in FIG. 3, the services provided by the service providing system 50 may be executed relevant to a conference system, an IC recorder, a digital camera, and the other device 16, other than the client terminal 11, the mobile terminal 12, the image forming apparatus 14, and the projector 15.

Furthermore, the classification format of the software items and the storage units illustrated in FIG. 3 is one example; in order to carry out the present embodiment, it is not essential that the software items and the storage units of the service providing system 50 are classified into the hierarchy illustrated in FIG. 3. That is to say, as long as the office devices such as the client terminal 11, the mobile terminal 12, the image forming apparatus 14, and the projector 15 can cooperate with the service application 51, the hierarchal relationship of the software items and the storage units of the service providing system 50 is not limited to a particular relationship.

The service providing system 50 functions as a cloud base including functions such as authentication and asynchronous conversion, and a group of services for providing services such as a print service using the function of the cloud base.

The cloud base is constituted by, for example, the platform 52, the management data storage unit 53, and the platform API 54. The group of services is constituted by, for example, the service application 51.

The authentication functions included in the cloud base of the service providing system 50 are constituted by the authentication processing unit 71, the substitute authentication unit 75, and the authentication database. The authentication database is constituted by the organization management information storage unit 81, the user management information storage unit 82, the device management information storage unit 83, the substitute authentication information storage unit 84, the substitute authentication token information storage unit 85, etc. Furthermore, the asynchronous conversion function included in the cloud base of the service providing system 50 is constituted by, for example, the data processing unit 74, the data management information storage unit 86, and the data storage 87.

The group of services such as the service application 51 uses functions such as authentication and asynchronous conversion included in the cloud base of the service providing system 50, to provide services. Furthermore, when the service group provides services in cooperation with functions of the external service system, the service group acquires an authentication token for accessing the external service system, via the authentication function of the cloud base.

Note that the external service system is a system other than the service providing system 50, and provides services such as a cloud service. In the present embodiment, a service (function) provided by the external service system is referred to as an "external service". External services include an online storage service provided as a cloud service and a storing/managing service of scanned documents. The external service system is equipped with a Web API for providing functions to the service providing system 50. In order to use the Web API, authentication by an authentication base of the external service system is required.

Furthermore, the service providing system 50 in FIG. 3 includes organization management information, user management information, device management information, substitute authentication information, and substitute authentication token information which are commonly used by the plurality of the service application 51, so that the authentication functions are integrated. Note that the service providing system 50 of FIG. 3 saves, in for example the HDD 508, information that needs to be saved permanently, such as organization management information, user management information, device management information, and substitute authentication information. Furthermore, in the service providing system 50 of FIG. 3, information such as the substitute authentication token information has an expiry date, and information having a shorter life cycle than that of other information (such as organization management information, user management information, device management information, and substitute authentication information) is saved in, for example, the RAM 504 (on-memory). By saving information having a shorter life cycle in the on-memory, the reading/writing of the substitute authentication token information becomes high speed, and the response becomes high speed.

Service Application 51

Figure 4:
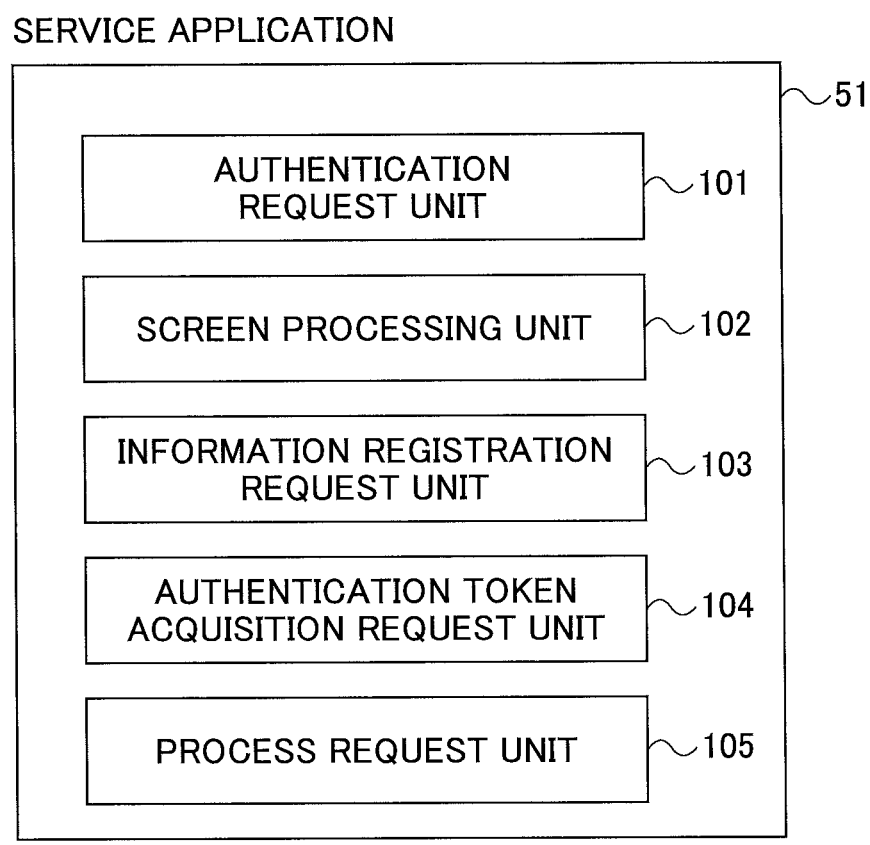
FIG. 4 is a process block diagram of an example of a service application according to an embodiment.

The service application 51 is realized by, for example, the process blocks as illustrated in FIG. 4. FIG. 4 is a process block diagram of an example of a service application according to the present embodiment. The service application 51 causes the computer system 500 to function as an authentication request unit 101, a screen processing unit 102, an information registration request unit 103, an authentication token acquisition request unit 104, and a process request unit 105.

The authentication request unit 101 requests the authentication processing unit 71 to perform authentication. The screen processing unit 102 performs processes relevant to the screen, such as generating an external service information registration screen described below. The information registration request unit 103 requests the authentication processing unit 71 to register information input to a screen such as an external service information registration screen generated by the screen processing unit 102.

The authentication token acquisition request unit 104 requests the authentication processing unit 71 to acquire an authentication token required to use the Web API of an external service system. The process request unit 105 uses the authentication token to request a process to the Web API of the external service system. The process request unit 105 may request the data processing unit 74 to perform an asynchronous process such as asynchronous conversion.

Authentication Processing Unit 71

Figure 5:
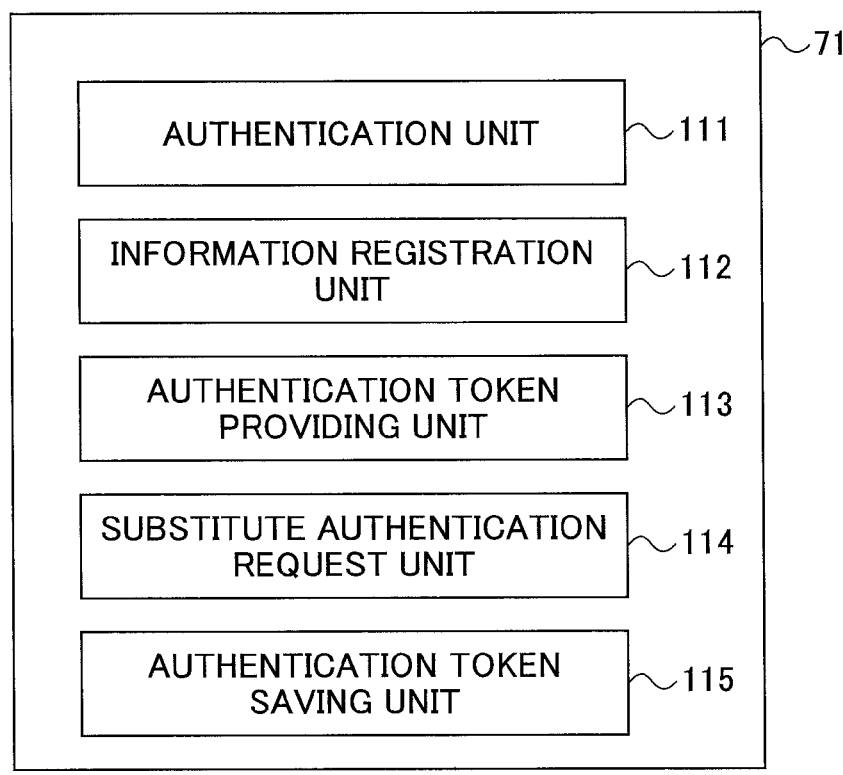
FIG. 5 is a process block diagram of an example of an authentication processing unit according to an embodiment.

The authentication processing unit 71 is realized by, for example, the process blocks as illustrated in FIG. 5. FIG. 5 is a process block diagram of an example of the authentication processing unit 71 according to the present embodiment. The authentication processing unit 71 includes an authentication unit 111, an information registration unit 112, an authentication token providing unit 113, a substitute authentication request unit 114, and an authentication token saving unit 115.

The authentication unit 111 receives a request for authentication, and issues an authentication ticket. The information registration unit 112 receives a request for information registration, and registers information. The authentication token providing unit 113 receives a request to acquire an authentication token, and if there is an authentication token that can be provided to the substitute authentication token information storage unit 85, the authentication token providing unit 113 provides the authentication token.

Note that when there is no authentication token that can be provided, the authentication token providing unit 113 requests the substitute authentication request unit 114 to acquire an authentication token, and provides the acquired authentication token. The substitute authentication request unit 114 uses substitute authentication information stored in the substitute authentication information storage unit 84 to acquire an authentication token from an external service system. The authentication token saving unit 115 saves the authentication token acquired from the external service system, in the substitute authentication token information storage unit 85.

Data Processing Unit 74

Figure 6:
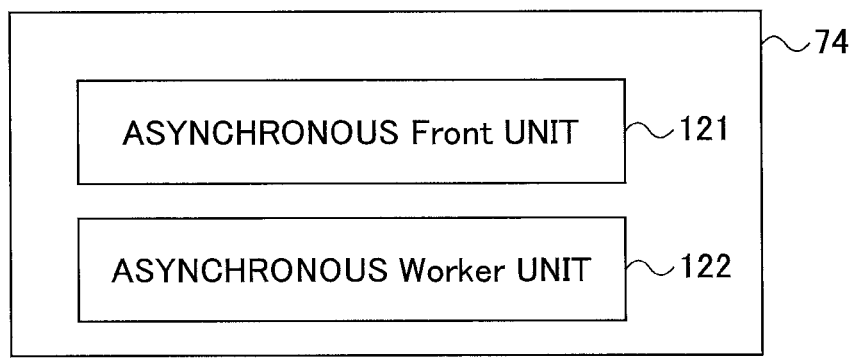
FIG. 6 is a process block diagram of an example of a data processing unit according to an embodiment.

The data processing unit 74 according to the present embodiment is realized by, for example, the process blocks as illustrated in FIG. 6. FIG. 6 is a process block diagram of an example of the data processing unit 74 according to the present embodiment. The data processing unit 74 includes an asynchronous front unit 121 and an asynchronous worker unit 122.

The asynchronous front unit 121 receives a request for an asynchronous process from the service application 51 as a job, and saves the request in the data management information storage unit 86 as a job. The data management information storage unit 86 functions as a message queue.

The asynchronous worker unit 122 sequentially acquires jobs from the data management information storage unit 86 and executes asynchronous processes. When using an external service system, the asynchronous worker unit 122 requests the authentication processing unit 71 to provide an authentication token of the external service system, and acquires the authentication token.

Management Data

FIG. 7 is a configuration diagram of an example of the organization management information. The organization management information of FIG. 7 includes, as data items, an id, an organization ID, and an organization name. The id is information for uniquely identifying a record in the organization management information. The organization ID is information for uniquely identifying an organization such as a company and a department. The organization ID is not limited to a word "organization"; for example, the ID may be information for identifying a contract. The organization name is the name of the organization.

FIG. 8 is a configuration diagram of an example of the user management information. The user management information in FIG. 8 includes, as data items, an id, an organization ID, a user ID, a password, and a user name. The id is information for uniquely identifying a record in the user management information. The user ID and the password are information for identifying the user in the authentication base of the service providing system 50. The user is the name of the user. A password is not essential.

Furthermore, as the user ID, an identification number of an electronic medium (for example, an IC card) held by the user may be used instead. A user ID and a password associated with the organization ID are unique, but may be overlapping if the organization ID is different.

FIG. 9 is a configuration diagram of an example of the device management information. The device management information in FIG. 9 includes, as data items, an id, an organization ID, device authentication information, business office information, and capability. The id is information for uniquely identifying a record in the device management information. The device authentication information is information for device authentication for determining that the office device has a particular condition. The device authentication information may be an ID for indicating that a particular application is installed, or a device number indicating a particular device. The business office information expresses, for example, the business office where an office device is installed. Furthermore, the capability expresses, for example, the capability of the office device.

FIG. 10 is a configuration diagram of an example of the substitute authentication information. The substitute authentication information in FIG. 10 includes, as data items, an id, an organization ID, a user ID, an external service name, an external service user name, an external service password, and additional information. The id is information for uniquely identifying a record in the substitute authentication information.

An external service name is an example of information for uniquely identifying an external service system, and is the name of the external service system. The external service user name and the external service password are information for identifying a user in an authentication base of the external service system.

The additional information may be information other than the external service user name and the external service password required for acquiring an authentication token from the external service system, or may be a message used by the user identifying the substitute authentication information. In the substitute authentication information of FIG. 10, information unique to an external service system can be registered as additional information, and therefore a new external service system can be easily added without depending on a particular external service system.

FIG. 11 is a configuration diagram of an example of the substitute authentication token information. The substitute authentication token information in FIG. 11 includes, as data items, an id, an organization ID, a user ID, an external service name, an authentication token, and an expiration date. The id is information for uniquely identifying a record in the substitute authentication token information. An authentication token is an authentication token (access parameter) acquired from an external service system. The expiration date is the expiration date of the authentication token.

Details of Process

In the following, a description is given of details of a process performed by the system according to the present embodiment.

Registration of Substitute Authentication Information

Figure 12:
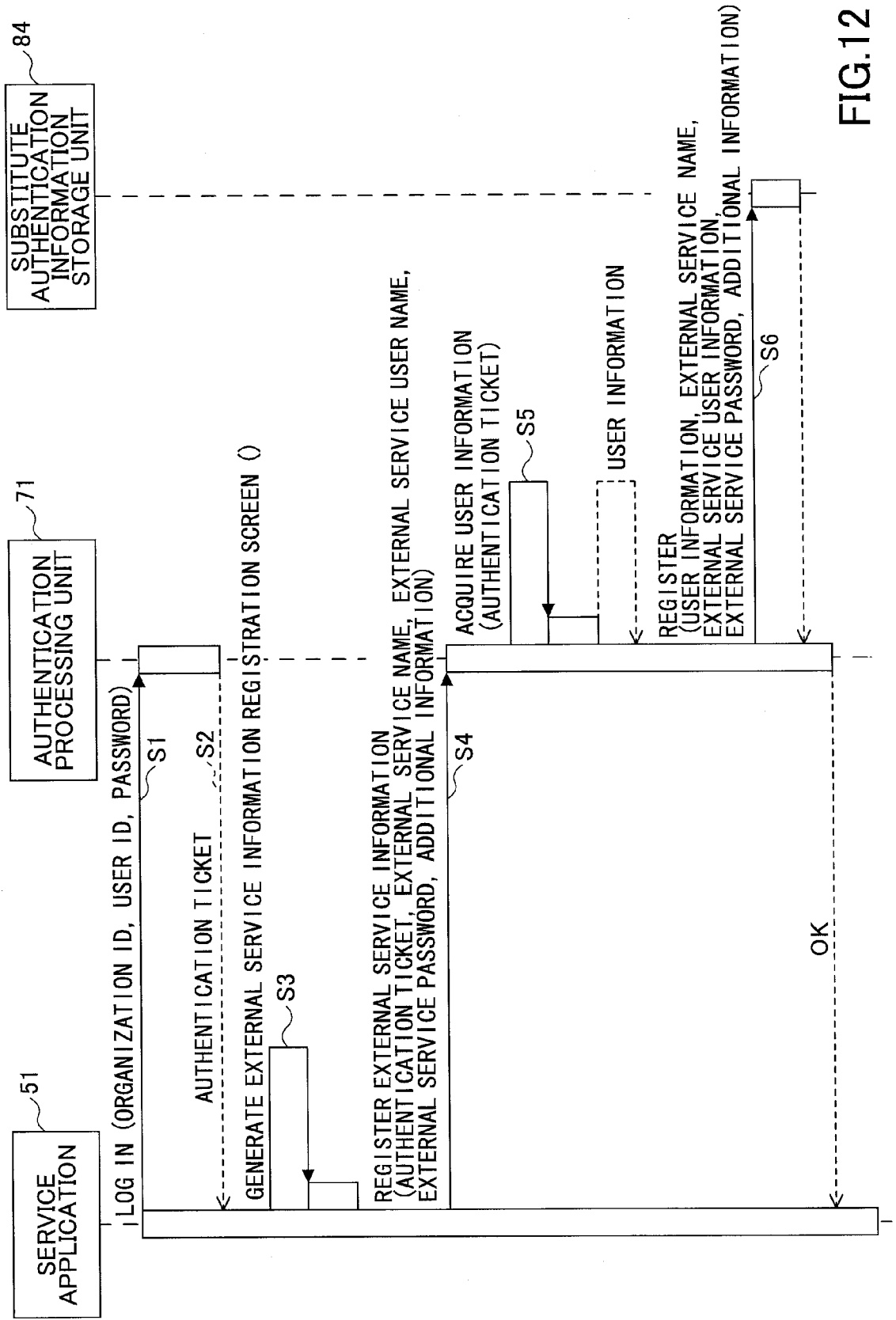
FIG. 12 is a sequence diagram expressing an example of processing procedures for registering substitute authentication information.

FIG. 12 is a sequence diagram expressing an example of processing procedures for registering substitute authentication information. The sequence diagram of FIG. 12 illustrates a process of registering substitute authentication information such as account information of an external service system required for acquiring an authentication token from the external service system.

The service application 51 receives a log in request using account information such as an organization ID, a user ID and a password, from an office device such as the client terminal 11 operated by the user. In step S1, the service application 51 requests the authentication processing unit 71 to perform authentication by using the organization ID, the user ID, and the password included in the received log in request.

When the request to perform authentication by using the organization ID, the user ID, and the password as authentication information, is received from the service application 51, the authentication processing unit 71 refers to the user management information stored in the user management information storage unit 82, and performs authentication on the authentication information. When the authentication of the authentication information is successful, the authentication processing unit 71 generates an authentication ticket. In step S2, the authentication processing unit 71 returns an authentication ticket to the service application 51. The service application 51 returns an authentication ticket to the office device that is the source of the log in request. Thereafter, the office device can use the functions of the service providing system 50 by using the authentication ticket. The authentication processing unit 71 manages the authentication ticket and the user information (organization ID, user ID, etc.) in association with each other.

The service application 51 receives a request to register the substitute authentication information from the office device operated by the user. In step S3, for example, the service application 51 generates an external service information registration screen as illustrated in FIG. 13, and displays the external service information registration screen on the office device operated by the user.

Figure 13:
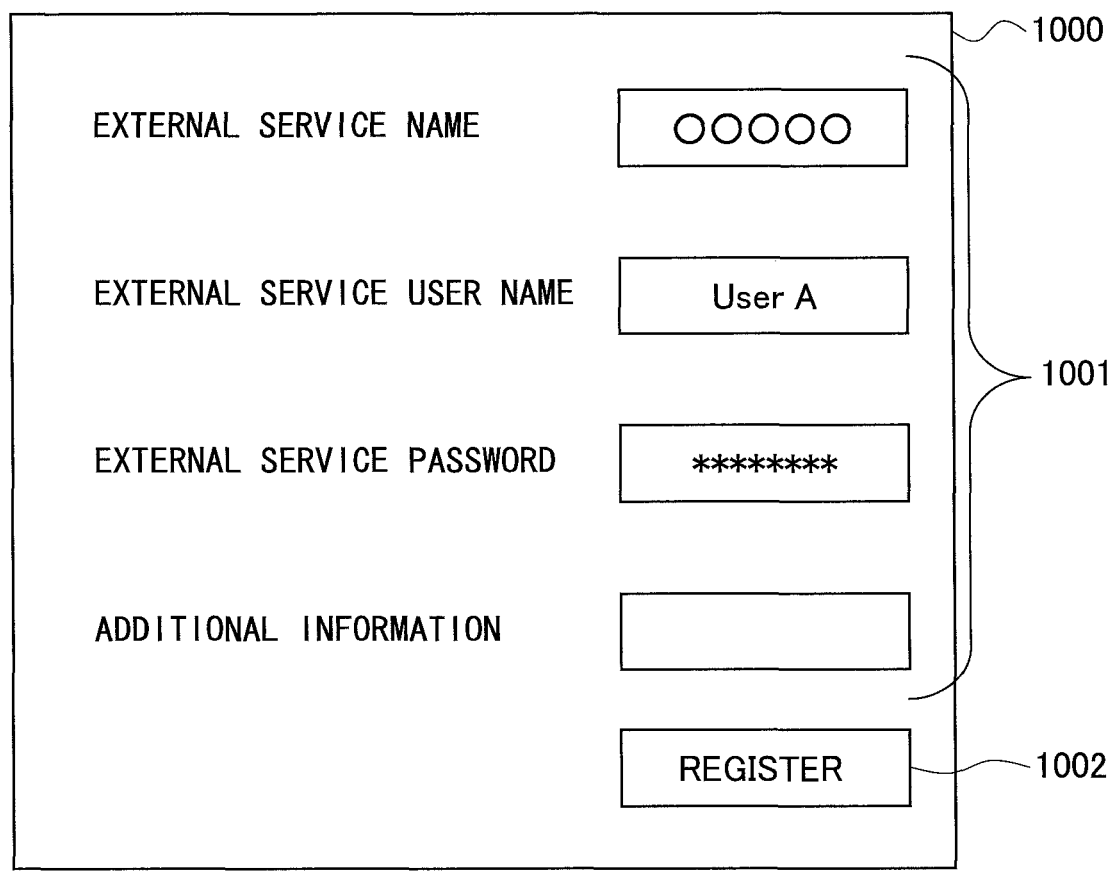
FIG. 13 is an image diagram of an example of an external service information registration screen.

FIG. 13 is an image diagram of an example of an external service information registration screen. An external service information registration screen 1000 shown in FIG. 13 includes fields 1001 for inputting an external service name, an external service user name, an external service password, and additional information; and a registration button 1002. The user operates the office device to input information in the fields 1001 of the external service information registration screen 1000 and then to press the registration button 1002.

When the registration button 1002 is pressed, the service application 51 starts the process of step S4 and onward in FIG. 12. In step S4, the service application 51 requests the authentication processing unit 71 to register the external service information, by using the information input to the fields 1001 in the external service information registration screen 1000, and the authentication ticket acquired at step S2.

In step S5, the authentication processing unit 71 uses the authentication ticket included in the request to register the external service information, to acquire the user information associated with the authentication ticket. In step S6, the authentication processing unit 71 associates the user information associated with the authentication ticket, with the information input to the fields 1001 of the external service information registration screen 1000, and registers the associated information in the substitute authentication information storage unit 84.

Note that the external service information registration screen 1000 may be displayed on the office device operated by the user, for example, when the user presses an external service setting button 1011 from a user management information registration screen 1010 illustrated in FIG. 14. FIG. 14 is an image diagram of an example of the user management information registration screen 1010.

Figure 15:
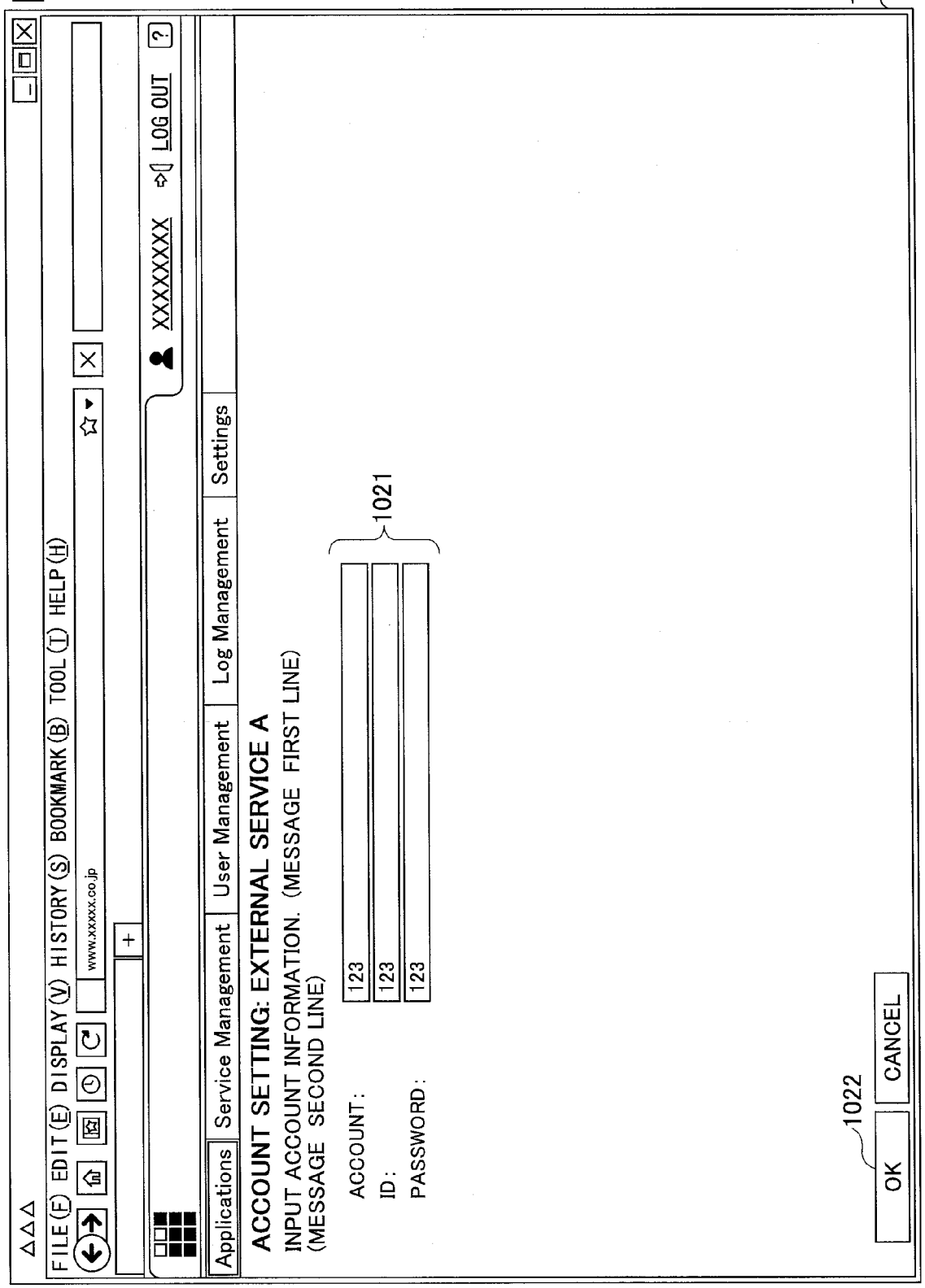
FIG. 15 is an image diagram of another example of the external service information registration screen.

Furthermore, the external service information registration screen 1000 is not limited to the example of FIG. 13; for example, the external service information registration screen 1000 may be as illustrated in FIG. 15. FIG. 15 is an image diagram of another example of the external service information registration screen. An external service information registration screen 1020 illustrated in FIG. 15 includes fields 1021 for inputting an account, an ID, and a password, and an OK button 1022.

The ID and the password in the external service information registration screen 1020 correspond to the external service user name and the external service password in the external service information registration screen 1000 of FIG. 13. Furthermore, the account in the external service information registration screen 1020 corresponds to the additional information in the external service information registration screen 1000 of FIG. 13. Note that the external service information registration screen 1020 is associated with an external service name, and therefore the field for inputting the external service identifier in FIG. 13 is omitted.

Usage of External Service

Figure 16:
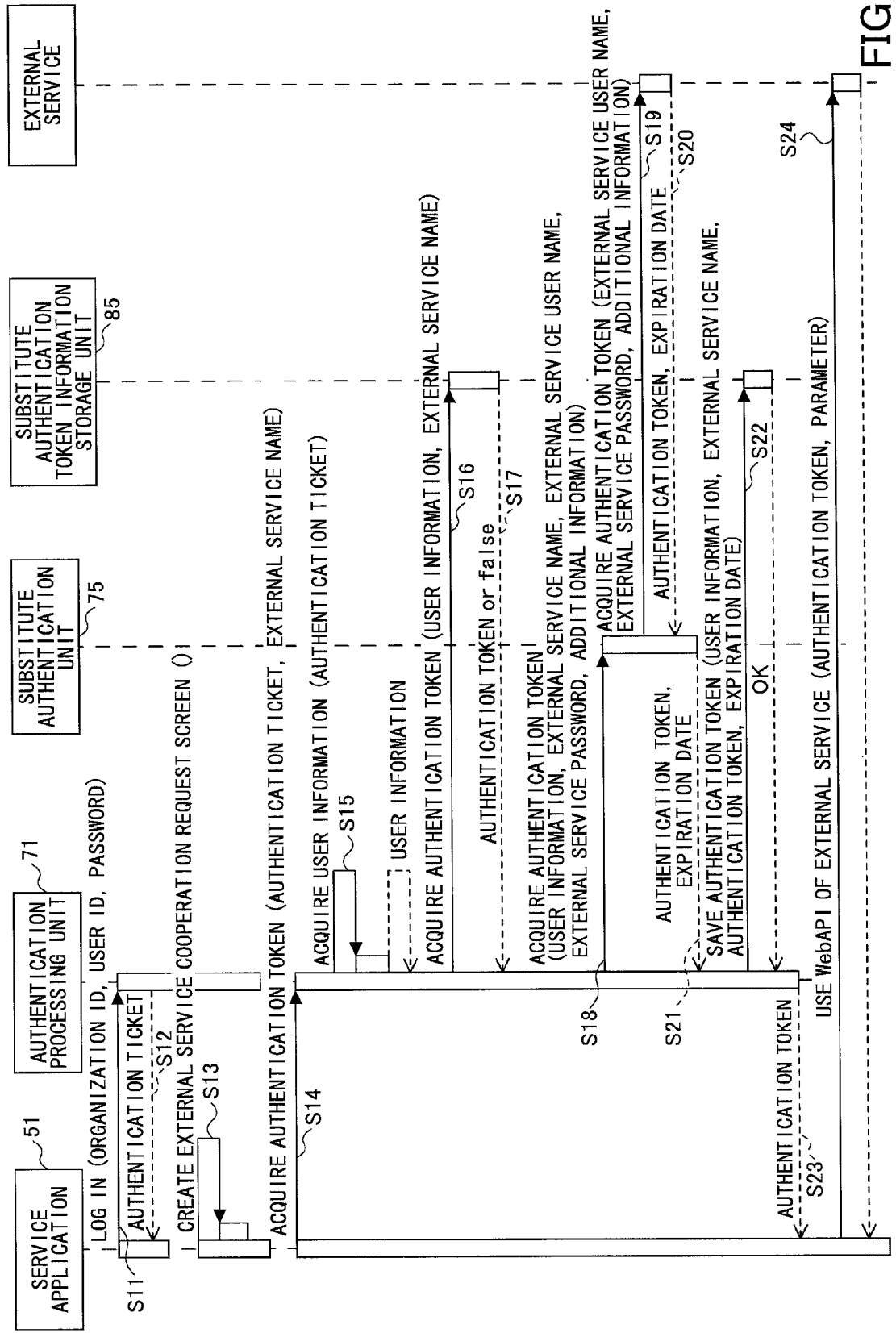
FIG. 16 is a sequence diagram expressing an example of processing procedures for using an external service.

FIG. 16 is a sequence diagram expressing an example of processing procedures for using an external service. The sequence diagram of FIG. 16 illustrates a process of acquiring an authentication token from an external service system, and using the authentication token to use an external service.

The processes of steps S11 and S12 are the same as steps S1 and S2 of FIG. 12, and therefore descriptions are omitted.

The service application 51 receives a request to cooperate with an external service from an office device operated by the user. In step S13, for example, the service application 51 generates an external service cooperation request screen as illustrated in FIG. 17, and displays the external service cooperation request screen on the office device operated by the user.

Figure 17:
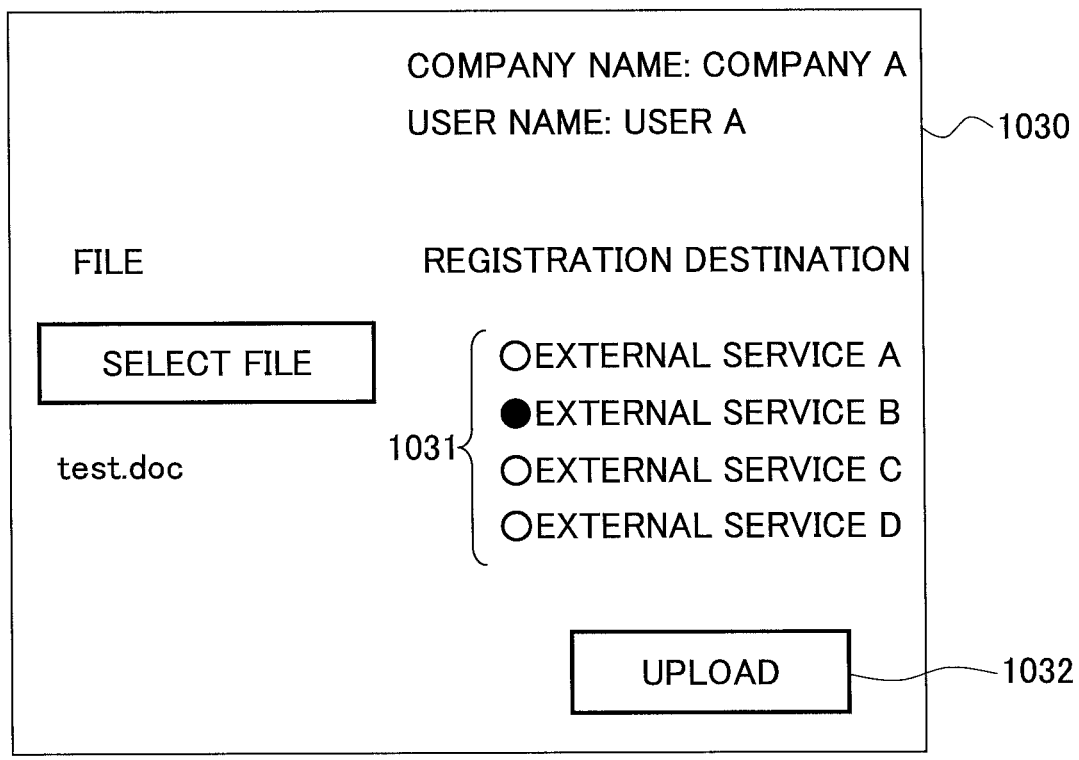
FIG. 17 is an image diagram of an example of an external service cooperation request screen.

FIG. 17 is an image diagram of an example of the external service cooperation request screen. An external service cooperation request screen 1030 of FIG. 17 indicates, as one example, a file upload cooperation screen. The external service cooperation request screen 1030 includes radio buttons 1031 for letting the user select an external service to cooperate with, and an upload button 1032. The user operates the office device to select an external service to cooperate with, and then presses the upload button 1032.

The external service cooperation request screen 1030 of FIG. 17 expresses an example where the user selects the external service to cooperate with. Note that as the service application 51 acquires, from the substitute authentication information storage unit 84, external service names associated with the organization ID and the user ID, the external service names whose substitute authentication information has been registered, can be displayed on the external service cooperation request screen 1030. When the upload button 1032 is pressed, the service application 51 starts the processes of step S14 and onward in FIG. 16.

In step S14, the service application 51 requests the authentication processing unit 71 to acquire an authentication, by using the external service name of the external service selected from the external service cooperation request screen 1030 and the authentication ticket acquired at step S12.

In step S15, the authentication processing unit 71 uses the authentication ticket included in the request to acquire the authentication token, to acquire user information associated with the authentication ticket. In step S16, the authentication processing unit 71 requests the substitute authentication token information storage unit 85 to acquire an authentication token associated with the user information associated with the authentication ticket, and the external service name of the external service selected by the user from the external service cooperation request screen 1030.

When the authentication token associated with user information and the external service name is saved in the substitute authentication token information storage unit 85, in step S17, the authentication processing unit 71 acquires an authentication token and an expiration date from the substitute authentication token information storage unit 85. Meanwhile, when the authentication token associated with user information and the external service name is not saved in the substitute authentication token information storage unit 85, in step S17, the authentication processing unit 71 receives from the substitute authentication token information storage unit 85, an indication of "false" indicating that there is no corresponding authentication token.

When the authentication processing unit 71 acquires an authentication token that has not expired from the substitute authentication token information storage unit 85, in step S23, the authentication processing unit 71 provides the authentication token to the service application 51 that is the source of the request to acquire the authentication token.

Meanwhile, when the authentication processing unit 71 cannot acquire an authentication token that has not expired from the substitute authentication token information storage unit 85, the authentication processing unit 71 acquires, from the substitute authentication information storage unit 84, external service information (external service user name, external service password, additional information) associated with the user information and the external service name. In step S18, the authentication processing unit 71 uses the user information, the external service name, and the external service information to request the substitute authentication unit 75 to perform substitute authentication.

In step S19, the substitute authentication unit 75 requests the external service system identified by the external service name, to provide an authentication token by using the external service information. In step S20, the substitute authentication unit 75 acquires an authentication token and an expiration date from the external service system. In step S21, the substitute authentication unit 75 provides the authentication token and the expiration date acquired from the external service system, to the authentication processing unit 71.

In step S22, the authentication processing unit 71 saves the authentication token and the expiration date provided from the substitute authentication unit 75, in the substitute authentication token information storage unit 85 in association with the user information and the external service name. Then, in step S23, the authentication processing unit 71 provides the authentication token to the service application 51 that is the source of the request to acquire the authentication token. Then, in step S24 and onward, the service application 51 can use the authentication token that has been provided, to request a process to the Web API of the external service system.

Note that the authentication token that has been associated with the same user information and external service name can be shared among different service applications 51, and therefore the session information exchanged with the external service system can be reduced, so that the load applied on the external service system can be decreased.

Another Example of Registering Substitute Authentication Information

Figure 18:
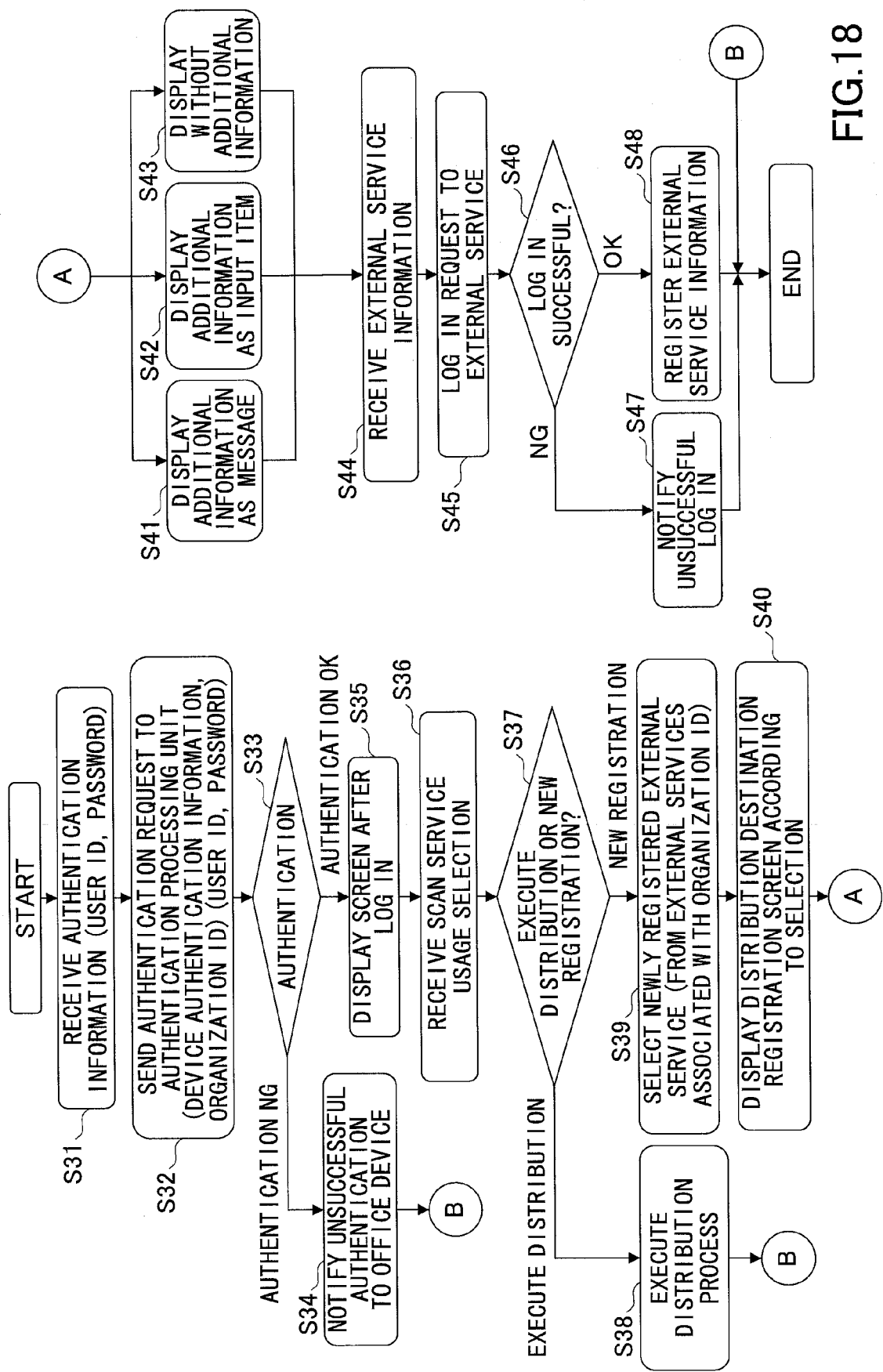
FIG. 18 is a flowchart expressing another example of processing procedures of registering substitute authentication information.
Figure 19:
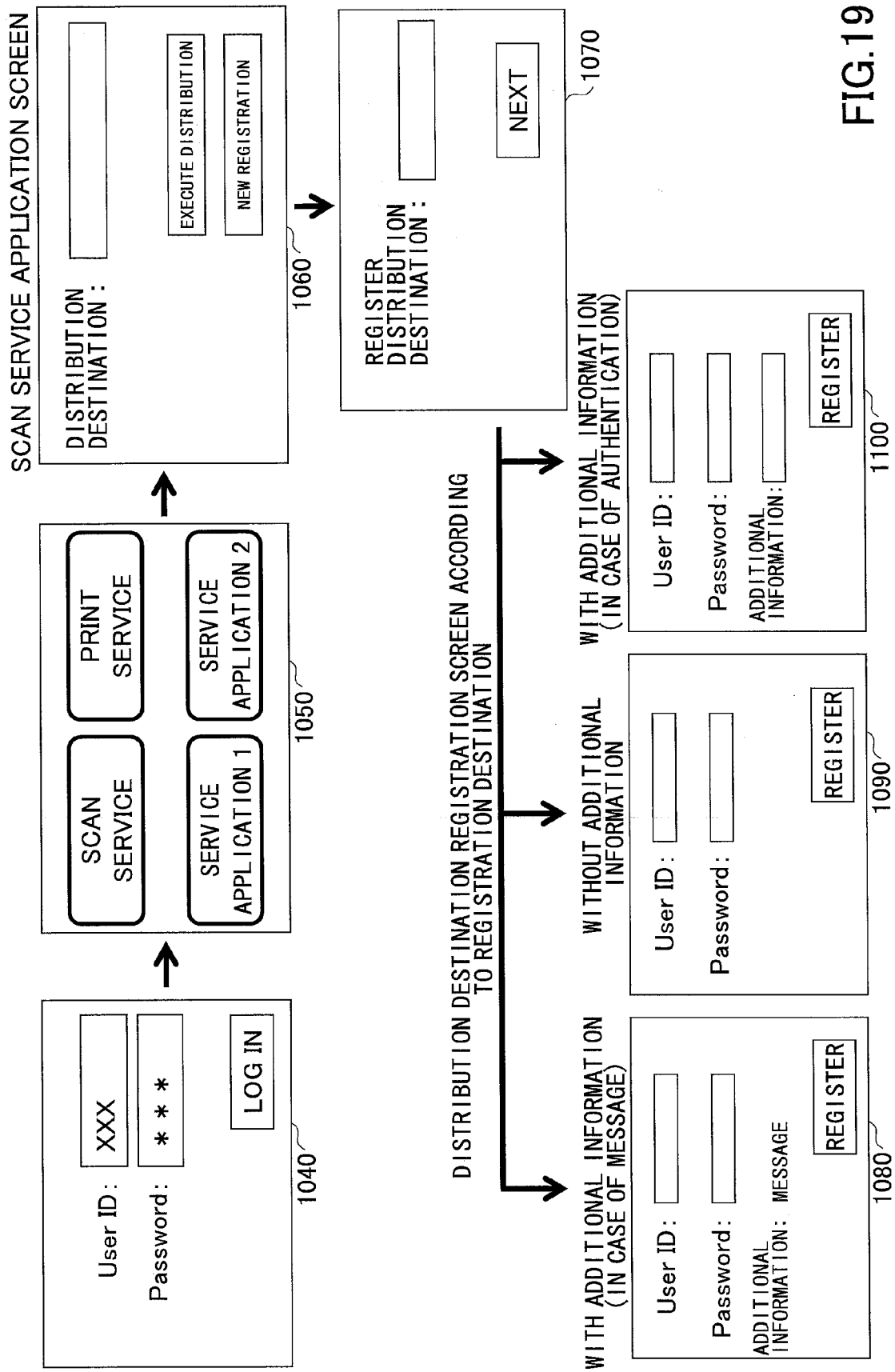
FIG. 19 is an example of a screen transition diagram in the processing procedures of registering substitute authentication information.

Next, a description is given of another example of registering substitute authentication information described with reference to the sequence diagram of FIG. 12, is described with reference to a flowchart of FIG. 18 and a screen transition diagram of FIG. 19. FIG. 18 is a flowchart expressing another example of processing procedures of registering substitute authentication information. FIG. 19 is an example of a screen transition diagram in the processing procedures of registering substitute authentication information. FIGS. 18 and 19 indicate a process of registering substitute authentication information such as account information of an external service system required for acquiring an authentication token from the external service system.

In step S31, the service application 51 displays, for example, an authentication screen 1040 of FIG. 19, on the office device operated by the user. The user inputs a user ID and a password in the authentication screen 1040 and presses the log in button.

When the log in button is pressed, the service application 51 receives a user ID, a password, device authentication information, and an organization ID from the office device operated by the user. Note that the device authentication information and the organization ID are set in the office device in advance. The device authentication information is information used when authenticating the validity of using a service at an office device accessing (attempting to log in) the service providing system 50. Note that according to the type of office device and the service/function to be used, it may be possible to access (log in) the service providing system 50 without requiring device authentication information.

In step S32, the service application 51 requests the authentication processing unit 71 to perform authentication by using the device authentication information, the organization ID, the user ID, and the password received from the client terminal 11 operated by the user. In step S33, when the request to perform authentication by using the device authentication information, the organization ID, the user ID, and the password as the authentication information, is received from the service application 51, the authentication processing unit 71 refers to the user management information and the device management information, and performs authentication on the authentication information.

When the authentication of the authentication information is unsuccessful, the service application 51 proceeds to step S34, and notifies the office device operated by the user that the authentication is unsuccessful. When the authentication of the authentication information is successful, in step S35, the service application 51 displays, on the office device operated by the user, for example a service application selection screen 1050 of FIG. 19 that is an example of a screen after log in. The user selects, for example, a scan service from the service application selection screen 1050.

In step S36, when the scan service selected, the scan service application 62 displays, on the office device operated by the user, for example, a scan service application screen 1060 of FIG. 19. The user presses the distribution execution button or the new registration button in the scan service application screen 1060.

When the distribution execution button is pressed, in step S38, the scan service application 62 executes a distribution process. Meanwhile, when the new registration button is pressed, the scan service application 62 proceeds to step S39, and displays, on the office device operated by the user, a distribution destination registration screen 1070 for letting the user select an external service, as a distribution destination to be newly registered.

Note that the external service that can be selected in the distribution destination registration screen 1070 is an external service that is associated with the organization ID in advance. The user selects the external service to be newly registered in the distribution destination registration screen 1070, and presses the "next" button.

In step S40, the scan service application 62 displays, on the office device operated by the user, any one of distribution destination registration screens 1080, 1090, 1100, according to the external service selected by the user as the distribution destination to be newly registered.

In step S41, the distribution destination registration screen 1080 for displaying additional information as a message, is displayed on the office device operated by the user. In step S42, the distribution destination registration screen 1100 for displaying additional information as input items, is displayed on the office device operated by the user. In step S43, the distribution destination registration screen 1090 that does not display additional information, is displayed on the office device operated by the user.

Note that it can be distinguished whether the additional information is information for displaying a message or information for displaying input items (item names for inputting values), by registering and managing the additional information items as separate items (for example, registering the additional information for displaying a message as first additional information, and registering the additional information for displaying input items as second additional information). Furthermore, for example, the additional information may be distinguished by applying an attribute of either display-use or input-use, receiving a selection of the attribute when the additional information is registered, and managing the additional information in association with the selected attribute.

The user operates the office device to input the external service information in any one of the distribution destination registration screens 1080, 1090, 1100, and then presses the registration button. When the registration button is pressed, the scan service application 62 starts the processes of step S44 and onward. In step S44, the scan service application 62 receives the external service information input in any one of the distribution destination registration screens 1080, 1090, 1100.

The scan service application 62 uses the external service information input in any one of the distribution destination registration screens 1080, 1090, 1100 to request the authentication processing unit 71 to register the external service information. The authentication processing unit 71 uses the external service information to request the substitute authentication unit 75 to perform substitute authentication. In step S45, the substitute authentication unit 75 requests the external service system identified by the external service name, to log in using the external service information. In step S46, the substitute authentication unit 75 determines whether the log in to the external service system using the external service information is successful or unsuccessful, and notifies the determination result to the authentication processing unit 71.

When the log in to the external service system using the external service information is unsuccessful, in step S47, the authentication processing unit 71 notifies the office device operated by the user that the log in to the external service system is unsuccessful. When the log in to the external service system using the external service information is successful, in step S48, the authentication processing unit 71 registers, in the substitute authentication information storage unit 84, the user information associated to the authentication ticket and the external service information input to any one of the distribution destination registration screens 1080, 1090, 1100, in association with each other.

In the process of registering the substitute authentication information illustrated in FIG. 18, the distribution destination registration screen is changed according to the external service information required for logging in to the external service system. Furthermore, in the process of registering the substitute authentication information illustrated in FIG. 18, after confirming that the logging in to the external service system is successful, the external service information can be registered in the substitute authentication information storage unit 84.

Cooperation Between Asynchronous Process and External Service System

Figure 20:
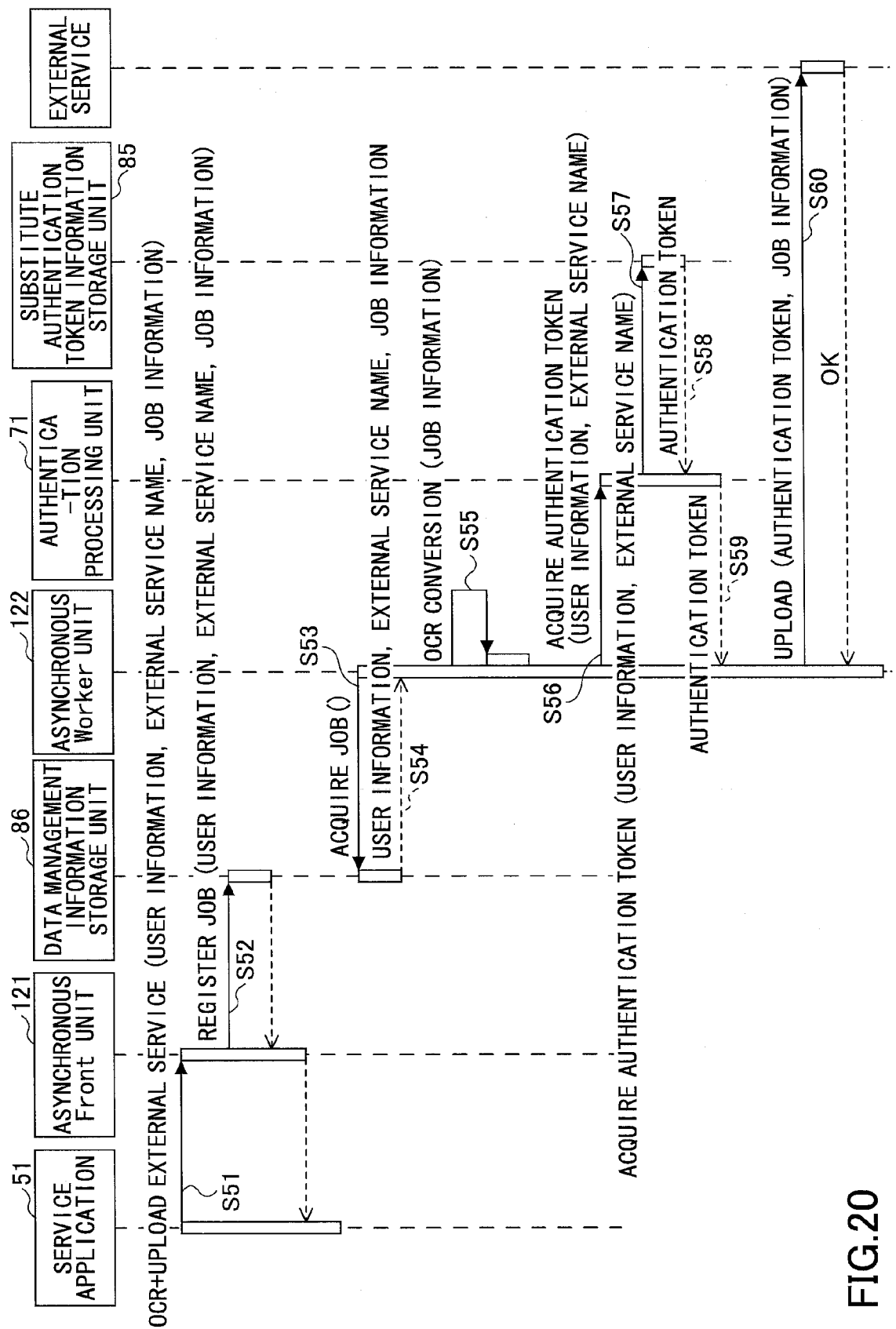
FIG. 20 is a sequence diagram expressing an example of processing procedures for the cooperation between an asynchronous process and an external service system.

FIG. 20 is a sequence diagram expressing an example of processing procedures for the cooperation between an asynchronous process and an external service system. The sequence diagram of FIG. 20 illustrates a process of performing an OCR conversion process, which is an example of an asynchronous process performed by the asynchronous worker unit 122 of the data processing unit 74, and then uploading data to the external service system.

As illustrated in FIG. 20, in a case where an OCR conversion process, which is an example of an asynchronous process, is performed, and then the external service system is used, the interaction with the external service system depends on the asynchronous worker unit 122. Usually, when the service application 51 acquires an authentication token of the external service from the authentication processing unit 71, an authentication ticket of the authentication processing unit 71 is required.

However, in the case of an asynchronous process, when the asynchronous worker unit 122 uses an authentication ticket to request the authentication processing unit 71 to acquire an authentication token of an external service, there is a possibility that the authentication ticket may be expired. Thus, in the service providing system 50 of the present embodiment, the asynchronous worker unit 122 is trusted, so that the authentication ticket is not required when requesting to acquire the authentication token of the external service.

For example, by providing the authentication processing unit 71 and the asynchronous worker unit 122 in the same network, the asynchronous worker unit 122 is trusted. It can be determined whether the asynchronous worker unit 122 is provided in the same network, for example, by an IP address. Furthermore, the relationship of trust between the authentication processing unit 71 and the asynchronous worker unit 122 can be built by introducing an authentication function such as basic authentication, other than controlling the network.

For example, when a process of uploading the data to the external service system after the OCR conversion process is requested by the user, in step S51, the service application 51 uses the user information, the external service name, and the job information to request the asynchronous front unit 121 to perform the process of uploading the data to the external service system after the OCR conversion process.

In step S52, the asynchronous front unit 121 registers, in the data management information storage unit 86 as a job, the process of uploading the data to the external service system after the OCR conversion process requested by the service application 51.

The asynchronous worker unit 122 that performs the asynchronous process sequentially acquires the jobs registered in the data management information storage unit 86, and processes the jobs. In step S53, the asynchronous worker unit 122 acquires the job of the process of uploading the data to the external service system after the OCR conversion process, registered in the data management information storage unit 86.

In step S55, the asynchronous worker unit 122 reads the data specified by the job information from the data storage 87, and performs an OCR conversion process. In step S56, the asynchronous worker unit 122 uses the user information and the external service name, to request the authentication processing unit 71 to acquire an authentication token. In step S57, the authentication processing unit 71 requests the substitute authentication token information storage unit 85 to acquire the authentication token associated with the user information and the external service name.

In step S58, the authentication processing unit 71 acquires the authentication token associated with the user information and the external service name, from the substitute authentication token information storage unit 85. In step S59, the authentication processing unit 71 provides the authentication token associated with the user information and the external service name, to the asynchronous worker unit 122.

Then, in step S60, the asynchronous worker unit 122 uses the authentication token provided from the authentication processing unit 71, to upload the data that has undergone the OCR conversion process, to the external service system.

Figure 21:
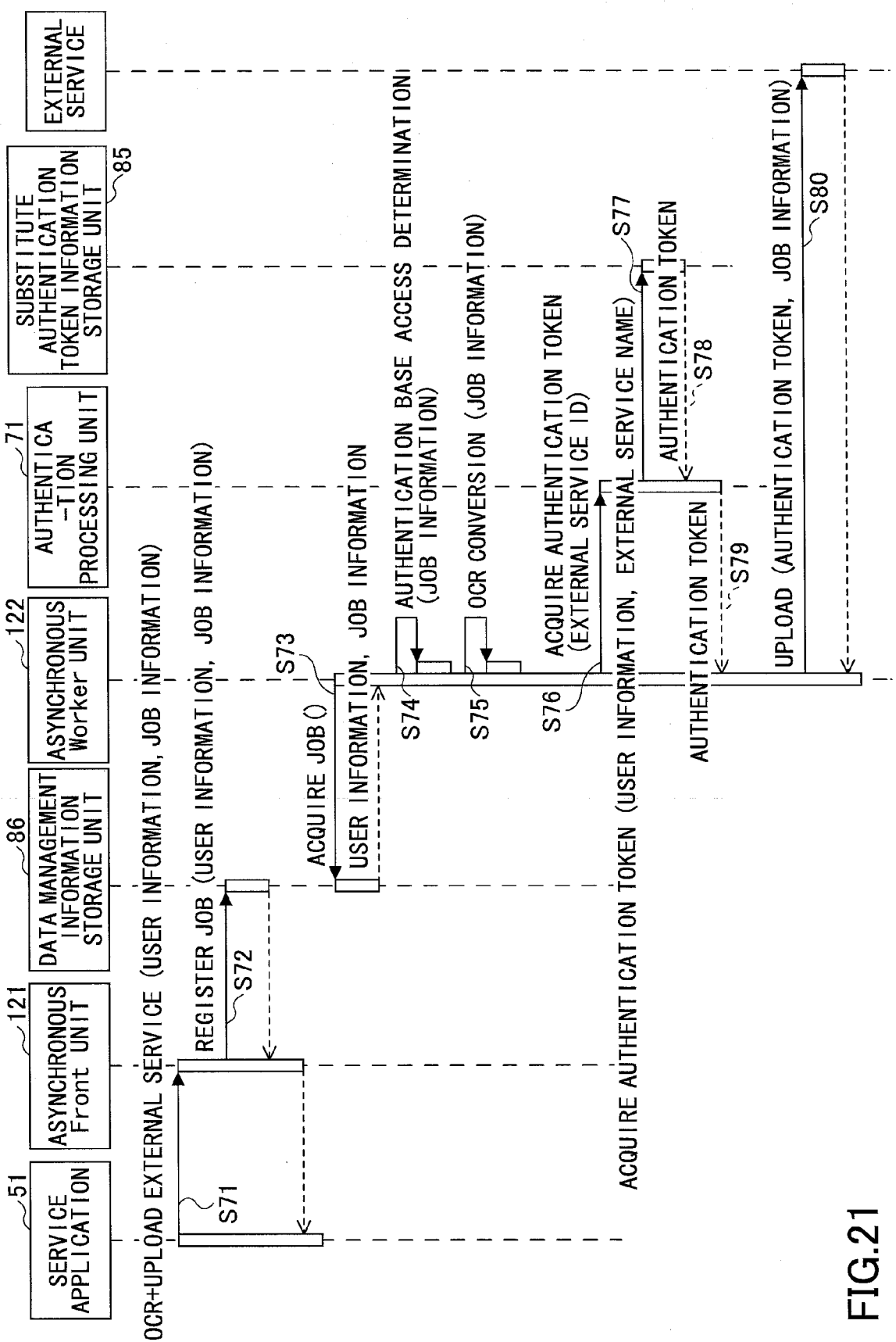
FIG. 21 is a sequence diagram expressing another example of processing procedures for the cooperation between an asynchronous process and an external service system.

Furthermore, FIG. 21 is a sequence diagram expressing another example of processing procedures for the cooperation between an asynchronous process and an external service system. The sequence diagram of FIG. 21 expresses the processing procedures when using substitute authentication information as shown in FIG. 22. FIG. 22 is a configuration diagram of another example of the substitute authentication information.

The substitute authentication information in FIG. 22 includes, as data items, an id, an organization ID, a user ID, an external service ID, an external service name, an external service user name, an external service password, and additional information. The substitute authentication information in FIG. 22 is formed by adding an external service ID as a data item, to the substitute authentication information in FIG. 10.

The external service ID included in the substitute authentication information in FIG. 22 is information for uniquely identifying an organization ID, a user ID, an external service ID, an external service name, an external service user name, an external service password, and additional information. If the organization ID and the user identified by the user ID are different, different external service IDs are given even when the external service name is the same. For example, the external service ID may be generated by the authentication processing unit 71, and registered in the substitute authentication information storage unit 84.

Except for one part, the sequence diagram of FIG. 21 is the same as the sequence diagram of FIG. 20, and therefore descriptions are omitted. For example, when a request to perform a process of uploading the data to the external service system after the OCR conversion process is received from the user, in step S71, the service application 51 requests the asynchronous front unit 121 to perform the process of uploading the information to the external service system after the OCR conversion process, using user information and job information. Note that it is assumed that in the job information, an external service ID indicated in the substitute authentication information of FIG. 22 is specified, in accordance with the process of uploading data to the external service system.

In step S72, the asynchronous front unit 121 registers the process of uploading the data to the external service system after the OCR conversion process requested by the service application 51, as a job in the data management information storage unit 86.

The asynchronous worker unit 122 that performs the asynchronous process sequentially acquires the jobs registered in the data management information storage unit 86, and processes the jobs. In step S73, the asynchronous worker unit 122 acquires the job of the process of uploading the data to the external service system after the OCR conversion process, registered in the data management information storage unit 86.

In step S74, the asynchronous worker unit 122 determines whether there is an access to the external service system, from the external service ID specified by the job information. When it is determined that there is an access to the external service system, the asynchronous worker unit 122 performs an OCR conversion process on the data specified by the job information, and then uses the external service ID to request the authentication processing unit 71 to acquire an authentication token.

In step S77, the authentication processing unit 71 identifies the user information and the external service name associated with the external service ID, and then specifies the user information and the external service name and requests the substitute authentication token information storage unit 85 to acquire an authentication token.

In step S78, the authentication processing unit 71 acquires the authentication token associated with the user information and the external service name, from the substitute authentication token information storage unit 85. In step S79, the authentication processing unit 71 provides the authentication token associated with the external service ID to the asynchronous worker unit 122.

Then, in step S80, the asynchronous worker unit 122 can upload the data that has undergone the OCR conversion process in the external service system, by using the authentication token provided from the authentication processing unit 71. Note that in step S74, when it is determined that there is no access to the external service system (a non-cooperation process), the processes of step S76 and onward are not performed.

Overview

According to the system 1 of the present embodiment, even in a case of using an external service, there is no need to perform, for each service application 51, the installation and testing of a function of registering/saving authentication information of the external service system, and a function of acquiring an authentication token from the external service system, and therefore the man-hours for developing the service application 51 can be reduced. Furthermore, according to the system 1 of the present embodiment, there is no need to manage the authentication token of the external service system for each service application 51, and security is improved.

According to the system 1 of the present embodiment, even when the service providing system 50 and the external service system have different authentication bases, the authentication base of the service providing system 50 performs a process of cooperating with the authentication base of the external service system by a single authentication process by the user, and therefore single sign-on by the user can be realized.

According to one embodiment of the present invention, system and a service providing device are provided, by which services can be used by a single authentication process by the user, even when the services have different authentication bases.

The system and the service providing device are not limited to the specific embodiments described herein, and variations and modifications may be made without departing from the scope of the present invention.

Note that the service providing system 50 corresponds to a "first service providing system", and the external service system corresponds to a "second service providing system". The service providing system 50 corresponds to a "service providing device". The authentication token corresponds to "authorization information after authentication". The authentication token acquisition request unit 104 corresponds to an "authorization information acquisition requesting unit", the substitute authentication token information storage unit 85 corresponds to a "first storage unit", the substitute authentication information storage unit 84 corresponds to a "second storage unit" and the substitute authentication request unit 114 corresponds to a "substitute authentication unit".

The authentication token providing unit 113 corresponds to an "authorization information providing unit", the information registration unit 112 corresponds to an "authentication information registration unit", the authentication token saving unit 115 corresponds to an "authorization information saving unit", the process request unit 105 corresponds to a "process request unit", the data management information storage unit 86 corresponds to a "third storage unit", the asynchronous front unit 121 corresponds to a "process receiving unit", and the asynchronous worker unit 122 corresponds to a "process executing unit".

The present application is based on and claims the benefit of priority of Japanese Priority Patent Application No. 2012-241367, filed on Oct. 31, 2012 and Japanese Priority Patent Application No. 2013-207070, filed on Oct. 2, 2013, the entire contents of which are hereby incorporated herein by reference.

What is claimed is:

1. A system comprising:
a first service providing system that comprises one or more computer processors that are configured to provide a service to a device; and
a second service providing system that comprises one or more computer processors, and that has an authentication base that is different from that of the first service providing system;
wherein the first service providing system and the second service providing system are connectable through a network;
wherein said one or more computer processors of said first service providing system are configured to:
receive, from the device operated by a user, a request for a process that uses the second service providing system, and make a request to acquire an authentication token for using the second service providing system; said authentication token being associated with a user;
acquire authentication information of the second service providing system from a second memory configured to store the authentication information of the second service providing system, when the authentication token associated with the user is not stored in a first memory configured to store the authentication token, and acquire the authentication token from the second service providing system by using the acquired authentication information; and
provide the authentication token stored in the first memory authentication token associated with the user is stored in the first memory, and provide the authentication token acquired from the second service providing system when the authentication token associated with the user is not stored in the first memory; and
wherein said one or more computer processors of said second service providing system are configured to receive the authentication token provided by the first service providing system, authenticate the received authentication token, and provide a service for the first service providing system.

2. The system according to claim 1, wherein said one or more computer processors of said first providing system are configured to:
receive a request to register the authentication information of the second service providing system, and register, in the second memory, the authentication information of the second service providing system in association with user information of the user.

3. The system according to claim 1, wherein said one or more computer processors of said first providing system are configured to:
save, in the first memory, the authentication token acquired from the second service providing system, in association with user information of the user and identification information of the second service providing system.

4. The system according to claim 1, wherein said one or more computer processors of said first providing system are configured to:
when an expired authentication token that is associated with the user is stored in the first memory:
acquire the authentication information of the second service providing system from the second memory, and acquire the authentication token from the second service providing system by using the authentication information that has been acquired, and
provide the authentication token that has been acquired from the second service providing system.

5. The system according to claim 2, wherein said one or more computer processors of said first providing system are configured to:
store information for identifying the user in the authentication base of the second service providing system, and additional information, as the authentication information of the second service providing system, and
receive a request to register the additional information as authentication information for using the second service providing system.

6. The system according to claim 5, wherein said one or more computer processors of said first providing system are configured to:

receive a request to register the additional information as information for identifying the authentication information of the second service providing system.

7. The system according to claim 1, wherein said one or more computer processors of said first providing system are configured to:
request a process from the second service providing system, by using the provided authentication token.

8. The system according to claim 7, wherein said one or more computer processors of said first providing system are configured to:
receive a request for an asynchronous process and a cooperative process for cooperating with the second service providing system, and register information of the cooperative process in a third memory; and
acquire the information of the cooperative process from the third memory, acquire the authentication token associated with the user from the first memory after performing the asynchronous process, and request the process from the second service providing system by using the acquired authentication token.

9. The system according to claim 8, wherein said one or more computer processors of said first providing system are configured to:
receive a request for the asynchronous process and a non-cooperative process that does not cooperate with the second service providing system, and registers information of the non-cooperative process in the third memory, and
acquire the information for the cooperative process from the third memory and then acquire the authentication token associated with the user from the first memory after performing the asynchronous process, request the process from the second service providing system by using the acquired authentication token, acquire the information of the non-cooperative process from the third memory, and perform the asynchronous process without cooperating with the second service providing system.

10. A service providing device for providing a service to a device, the service providing device comprising one or more computer processors that are configured to:
receive, from the device operated by a user, a request for a process that uses a service providing system having a different authentication base than the service providing device, and make a request to acquire an authentication token for using the service providing system; said authentication token being associated with a user;
acquire authentication information of the service providing system from a second memory configured to store the authentication information of the service providing system, when the authentication token associated with the user is not stored in a first memory configured to store the authentication token, and acquire the authentication token from the service providing system by using the acquired authentication information; and
provide the authentication token stored in the first memory when the authentication token associated with the user is stored in the first memory, and provide the authentication token acquired from the service providing system when the authentication token associated with the user is not stored in the first memory; and
wherein said one or more computer processors of said second service providing system are configured to receive the authentication token provided by the first service providing system, authenticate the received authentication token, and provide a service for the first service providing system.

11. A service providing method performed in a system including a first service providing system configured to provide a service to a device operated by a user, and a second service providing system that has an authentication base that is different from that of the first service providing system, wherein the first service providing system and the second service providing system each comprise one or more computer processors, the first service providing system and the second service providing system being connectable through a network, the service providing method comprising:
receiving, from the device operated by the user, a request for a process that uses the second service providing system, and making a request to acquire an authentication token for using the second service providing system; said authentication token being associated with a user;
acquiring authentication information of the second service providing system from a second memory configured to store the authentication information of the second service providing system when the authentication associated with the user is not stored in a first memory configured to store the authentication token, and acquiring the authentication token from the second service providing system by using the acquired authentication information; and
providing the authentication token stored in the first memory when the authentication token associated with the user is stored in the first memory, and providing the authentication token acquired from the second service providing system when the authentication token associated with the user is not stored in the first memory; and
wherein said one or more computer processors of said second service providing system are configured to receive the authentication token provided by the first service providing system, authenticate the received authentication token, and provide a service for the first service providing system.

* * * * *